(12) United States Patent
Murai et al.

(10) Patent No.: US 9,097,999 B2
(45) Date of Patent: Aug. 4, 2015

(54) POLYESTER, PIGMENT COMPOSITION, AND TONER

(75) Inventors: Yasuaki Murai, Kawasaki (JP); Masashi Kawamura, Yokohama (JP); Masatake Tanaka, Yokohama (JP); Takayuki Toyoda, Yokohama (JP); Yuki Hasegawa, Yokohama (JP); Masashi Hirose, Machida (JP); Takeshi Miyazaki, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/811,751

(22) PCT Filed: Aug. 18, 2011

(86) PCT No.: PCT/JP2011/069108
§ 371 (c)(1),
(2), (4) Date: Jan. 23, 2013

(87) PCT Pub. No.: WO2012/026504
PCT Pub. Date: Mar. 1, 2012

(65) Prior Publication Data
US 2013/0130164 A1    May 23, 2013

(30) Foreign Application Priority Data

Aug. 24, 2010   (JP) .................. 2010-186820

(51) Int. Cl.
*C08G 63/00* (2006.01)
*G03G 9/087* (2006.01)
(Continued)

(52) U.S. Cl.
CPC .............. *G03G 9/08755* (2013.01); *C08F 2/20* (2013.01); *C08G 63/6852* (2013.01); *C08G 63/6856* (2013.01); *C08K 5/0041* (2013.01);
(Continued)

(58) Field of Classification Search
CPC ........... C08G 63/6854; C08G 63/6856; C08G 63/914; C08G 63/916
USPC .................. 532/739; 525/418, 437; 528/288; 430/108.22
See application file for complete search history.

(56) References Cited

U.S. PATENT DOCUMENTS 6,504,045 B2    1/2003   Jung et al.
7,582,152 B2    9/2009   Jaunky et al.
(Continued)

FOREIGN PATENT DOCUMENTS

CN    1344762 A    4/2002
CN    101134811 A    3/2008
(Continued)

OTHER PUBLICATIONS

Datta E. Ponde et al., "Selective Catalytic Transesterification, Transthiolesterification, and Protection of Carbonyl Compounds over Natural Kaolinitic Clay" 63 (4) J. Org. Chem. 1058-1063 (Jan. 1998).

(Continued)

*Primary Examiner* — Gerard Higgins
(74) *Attorney, Agent, or Firm* — Fitzpatrick, Cella, Harper & Scinto

(57) ABSTRACT

Provided is a pigment dispersant for improving the dispersibility of an azo pigment for a water-insoluble solvent. More specifically, provided is a polyester, including at least one unit represented by one of the following formula (1) and the following formula (2):

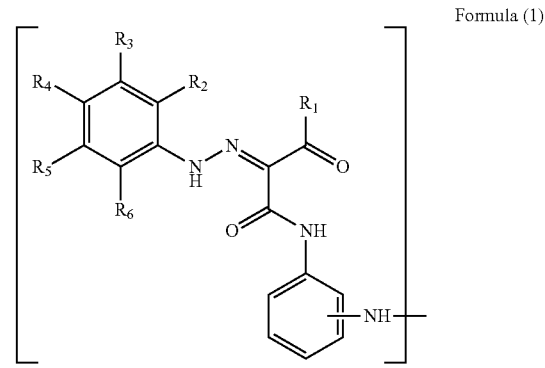

Formula (1)

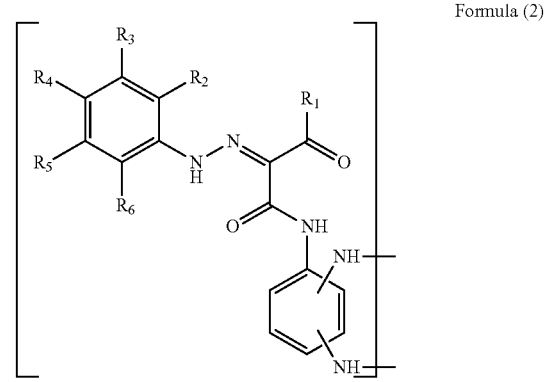

Formula (2)

in the formula (1) and the formula (2): $R_1$ represents an alkyl group having 1 to 6 carbon atoms or a phenyl group; $R_2$ to $R_6$ each represent a hydrogen atom, a $COOR_7$ group, or a $CONR_8R_9$ group, provided that at least one of the $R_2$ to $R_6$ represents the $COOR_7$ group or the $CONR_8R_9$ group; and the $R_7$ to $R_9$ each represent a hydrogen atom or an alkyl group having 1 to 3 carbon atoms.

9 Claims, 3 Drawing Sheets

(51) Int. Cl.
*C08F 2/20* (2006.01)
*C08G 63/685* (2006.01)
*C08K 5/00* (2006.01)
*C09B 69/10* (2006.01)
*G03G 9/09* (2006.01)

(52) U.S. Cl.
CPC .......... *C09B69/106* (2013.01); *G03G 9/08791* (2013.01); *G03G 9/08795* (2013.01); *G03G 9/08797* (2013.01); *G03G 9/091* (2013.01)

(56) References Cited

U.S. PATENT DOCUMENTS

| | | | |
|---|---|---|---|
| 8,628,899 B2 * | 1/2014 | Kawamura et al. | 430/108.22 |
| 8,759,441 B2 * | 6/2014 | Loccufier et al. | 524/590 |
| 2010/0273101 A1 | 10/2010 | Tani et al. | |
| 2013/0122413 A1 | 5/2013 | Tanaka et al. | |
| 2013/0224647 A1 * | 8/2013 | Ikeda et al. | 430/108.22 |
| 2013/0244165 A1 * | 9/2013 | Hashimoto et al. | 430/108.22 |

FOREIGN PATENT DOCUMENTS

| | | |
|---|---|---|
| EP | 2 634 635 A1 | 9/2013 |
| EP | 2 843 473 A1 | 3/2015 |
| JP | 2002-146227 A | 5/2002 |
| JP | 2004-045617 A | 2/2004 |
| JP | 3984840 B2 | 10/2007 |
| JP | 2010-138225 A | 6/2010 |
| JP | 2010-254846 A | 11/2010 |
| JP | 2010-277074 A | 12/2010 |
| WO | 99/42532 A1 | 8/1999 |
| WO | 2007/006635 A2 | 1/2007 |
| WO | 2007/006636 A2 | 1/2007 |
| WO | 2007/089859 A1 | 8/2007 |
| WO | 2009/060886 A1 | 5/2009 |
| WO | 2012/026378 A1 | 3/2012 |
| WO | 2012/026607 A1 | 3/2012 |

OTHER PUBLICATIONS

Kiran Kumar Solingapuram Sai et al., "Knorr Cyclizations and Distonic Superelectrophiles," 72 (25) J. Org. Chem. 9761-9764 (Nov. 2007).
Norman O. V. Sonntag, "The Reaction of Aliphatic Acid Chlorides," 52(2) Chemical Reviews 237-416 (1953).
John C. Sheehan et al., "Notes—A Convenient Synthesis of Water-Soluble Carbodiimides," 26 (7) J. Org. Chem. 2525-2528 (Jul. 1961).
First Office Action in Chinese Application No. 201180040475.8 (dated Dec. 26, 2013).
"Experimental Chemistry," first series, vol. 17-2, p. 162-179 (Maruzen Publishing Co., Ltd. 1956).
"New Experimental Chemistry," first series, vol. 15, p. 390-448 (Maruzen Publishing Co., Ltd. 1977).
J. Brandrup et al., "Polymer Handbook," (U.S.), 3rd edition, p. 209-277 (1989).
Extended European Search Report in European Application No. 11819967.8 (dated Jun. 3, 2015).

* cited by examiner

POLYESTER, PIGMENT COMPOSITION, AND TONER

TECHNICAL FIELD

The present invention relates to a polyester, a pigment composition containing the polyester, and a toner using the pigment composition as a coloring agent.

BACKGROUND ART

A polymer dispersant in which a site having an affinity for an azo pigment as a coloring agent and an oligomer or polymer having affinities for a solvent and a binding resin are covalently bonded to each other has been conventionally used as means for improving the pigment dispersibility of a toner having the azo pigment and the binding resin in an electrophotographic recording method (see Patent Literature 1). In addition, an example in which a comb polymer dispersant having an acidic or basic site known as Solsperse (registered trademark) is used has been disclosed (see Patent Literature 2). Meanwhile, an example in which a polymer dispersant obtained by bonding a chromophore having a molecular weight smaller than 95% of the molecular weight of an azo pigment to a side chain or terminal of a water-soluble polymer is used as a dispersant for the azo pigment in an inkjet recording method has been disclosed (Patent Literature 3).

However, the dispersibility of the pigment dispersant described in Patent Literature 2 or Patent Literature 3 is not sufficient because the adsorptivity of the dispersant for the azo pigment is insufficient. In addition, a water-soluble polymer is used in the pigment dispersant described in Patent Literature 1, and hence the dispersibility of the pigment for a water-insoluble solvent used as a dispersion medium is not sufficient. Further, the dispersant involves, for example, the following problem. The pigment exudes when the pigment undergoes the process of performing a treatment in an aqueous medium upon, for example, polymerization of the toner.

CITATION LIST

Patent Literature

PTL 1: Japanese Patent No. 3984840
PTL 2: International Patent Publication No. WO1999/042532
PTL 3: U.S. Pat. No. 7,582,152
PTL 4: International Patent Publication No. WO2009/060886

Non Patent Literature

NPL 1: Datta E. Ponde, and four others, "The Journal of Organic Chemistry," (U.S.), American Chemical Society, 1998, Vol. 63, No. 4, p. 1058-1063
NPL 2: Kiran Kumar Solingapuram Sai, and two others, "The Journal of Organic Chemistry," (US), American Chemical Society, 2007, Vol. 72, No. 25, p. 9761-9764
NPL 3: "Experimental Chemistry", MARUZEN PUBLISHING CO., LTD., first series, Vol. 17-2, p. 162-179
NPL 4: "New Experimental Chemistry" (MARUZEN PUBLISHING CO., LTD., first series, Vol. 15, p. 390-448)
NPL 5: Norman O. V. Sonntag, "Chemical Reviews", American Chemical Society, 1953, Vol. 52, No. 2, p. 237-416
NPL 6: John C. Sheehan, and two others, "The Journal of Organic Chemistry", American Chemical Society, 1961, Vol. 26, No. 7, p. 2525-2528
NPL 7: J. Brandrup, E. H. Immergut (ed.), "Polymer Handbook," (U.S.), 3rd edition, John Wiley & Sons, 1989, p. 209-277

SUMMARY OF INVENTION

Technical Problem

An object of the present invention is to provide a polyester having a high affinity for a pigment and capable of sufficiently improving the dispersibility of the pigment. Another object of the present invention is to provide a pigment composition that brings high affinities for a binding resin, a water-insoluble solvent, and the like. Still another object of the present invention is to provide a toner having a good tone by applying the pigment composition as a coloring agent for toner.

Solution to Problem

The present invention relates to a polyester, comprising at least one unit represented by one of the following formula (1) and the following formula (2):

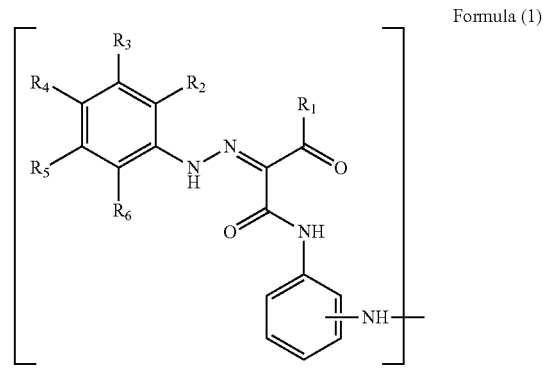

Formula (1)

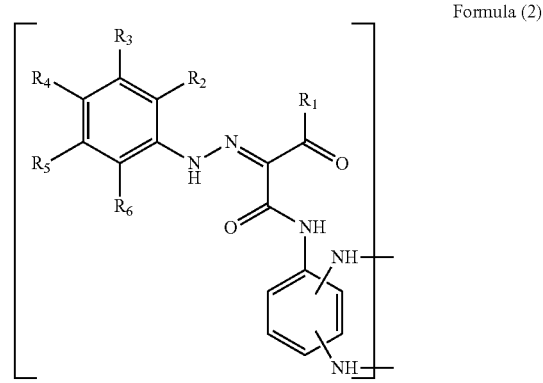

Formula (2)

in the formula (1) and the formula (2): $R_1$ represents an alkyl group having 1 to 6 carbon atoms or a phenyl group; $R_2$ to $R_6$ each represent a hydrogen atom, a $COOR_7$ group, or a $CONR_8R_9$ group, provided that at least one of the $R_2$ to $R_6$ represents the $COOR_7$ group or the $CONR_8R_9$ group; and the $R_7$ to $R_9$ each represent a hydrogen atom or an alkyl group having 1 to 3 carbon atoms.

The present invention also relates to a pigment composition and a toner containing the above-mentioned polyester.

Advantageous Effects of Invention

According to the present invention, the polyester having a high affinity for a pigment and capable of sufficiently improving the dispersibility of the pigment can be provided. According to the present invention, the pigment composition that brings high affinities for a binding resin, a water-insoluble solvent, and the like can also be provided. According to the present invention, the toner having a good tone can also be provided by applying the pigment composition as a coloring agent for toner.

DESCRIPTION OF EMBODIMENTS

Figure 1:
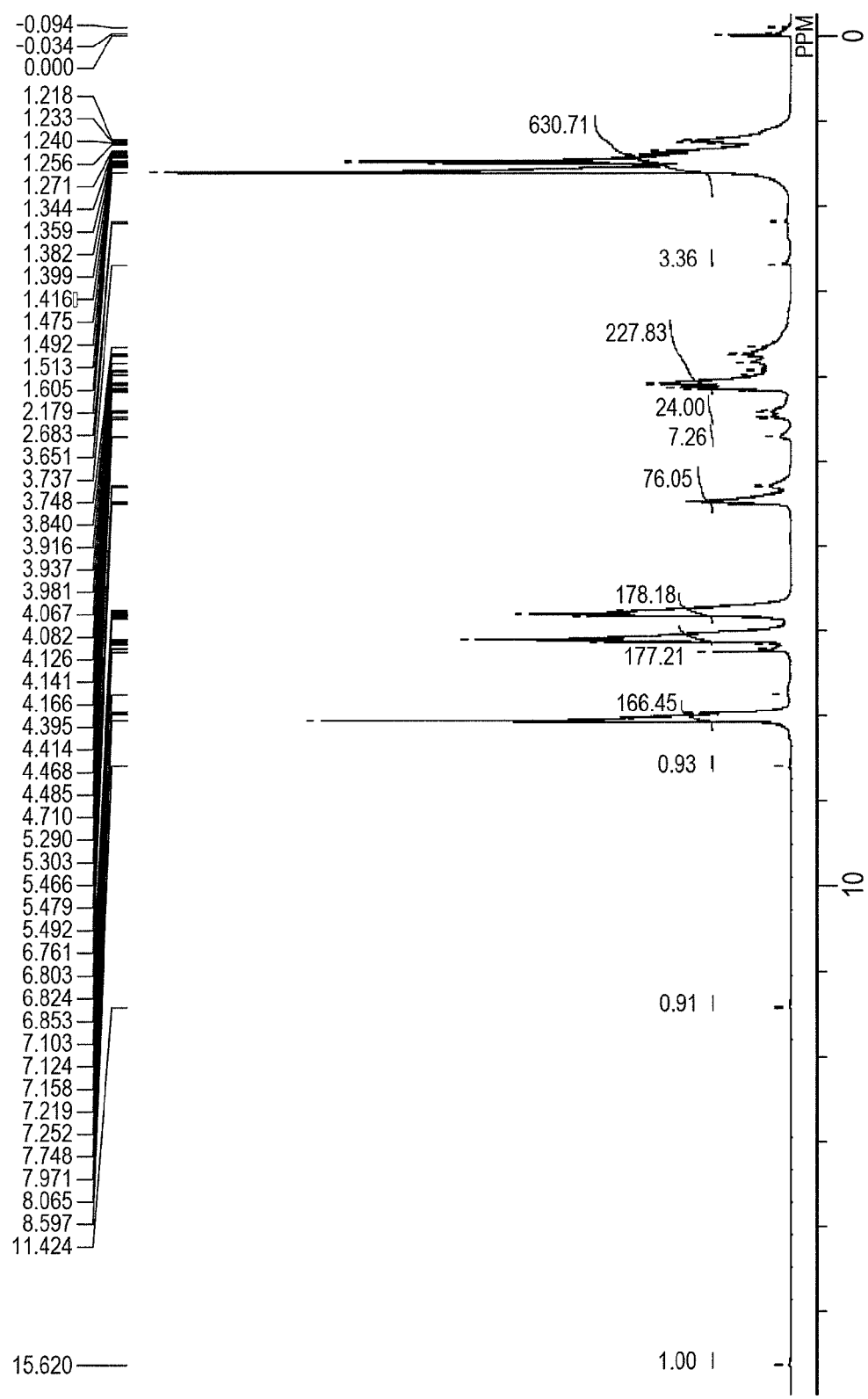
FIG. 1 is a view showing the $^1$H NMR spectrum of a polyester (26) having an azo dye skeleton in $CDCl_3$ at room temperature and 400 MHz.

The construction of a polyester having an azo dye skeleton of the present invention is described. The polyester having an azo dye skeleton of the present invention is such that one or more units represented by the following formula (1) or (2) each having a high affinity for an azo pigment are bonded to a polyester having a high affinity for a water-insoluble solvent.

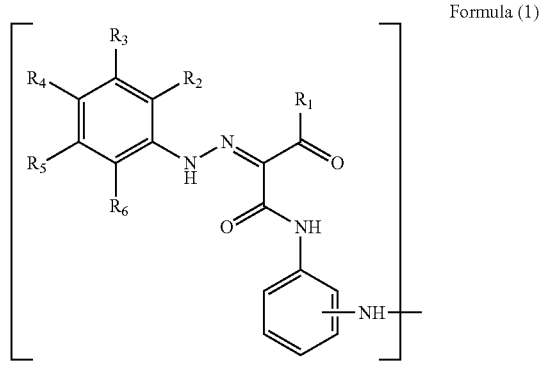

Formula (1)

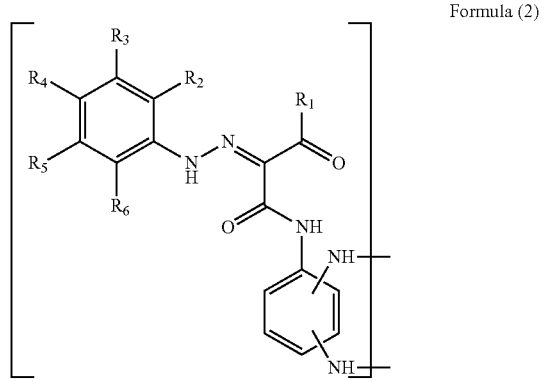

Formula (2)

(In the formula (1) or (2): $R_1$ represents an alkyl group having 1 to 6 carbon atoms or a phenyl group; $R_2$ to $R_6$ each represent a hydrogen atom, a $COOR_7$ group, or a $CONR_8R_9$ group, provided that at least one of the $R_2$ to $R_6$ represents the $COOR_7$ group or the $CONR_8R_9$ group; and the $R_7$ to $R_9$ each represent a hydrogen atom or an alkyl group having 1 to 3 carbon atoms.)

First, the azo dye skeleton unit represented by the above-mentioned formula (1) or (2) is described in detail.

The alkyl group represented by $R_1$ in the above-mentioned formula (1) or (2) is not particularly limited as long as the group has 1 to 6 carbon atoms. Examples of the alkyl group having 1 to 6 carbon atoms include a methyl group, an ethyl group, an n-propyl group, an n-butyl group, an n-pentyl group, an n-hexyl group, an isopropyl group, an isobutyl group, an sec-butyl group, a tert-butyl group, and a cyclohexyl group.

The substituent represented by $R_1$ in the above-mentioned formula (1) or (2) may have a functional group. Examples of the functional group include a halogen atom, a nitro group, an amino group, a hydroxyl group, a cyano group, and a trifluoromethyl group.

$R_1$ in the above-mentioned formula (1) or (2) preferably represents a methyl group from the viewpoint of an affinity for a pigment.

The polyester having an azo dye skeleton of the present invention is such that a —NH— group in the unit represented by the above-mentioned formula (1) or (2) forms an amide bond with a COOH group in the polyester.

The case where the substitution position of a —NH— group in the unit represented by the above-mentioned formula (1) or (2) is a 4-position with respect to an acylacetamide group is preferred in terms of an affinity for a pigment.

$R_2$ to $R_6$ in the above-mentioned formula (1) or (2) are each selected from a hydrogen atom, a $COOR_7$ group, and a $CONR_8R_9$ group, and at least one of $R_2$ to $R_6$ represents a $COOR_7$ group or a $CONR_8R_9$ group. The case where $R_2$ and $R_5$ each represent a $COOR_7$ group, and $R_3$, $R_4$, and $R_6$ each represent a hydrogen atom is preferred from the viewpoint of an affinity for a pigment.

Examples of the alkyl group represented by any one of $R_7$ to $R_9$ in the $COOR_7$ group and $CONR_8R_9$ group include a methyl group, an ethyl group, an n-propyl group, and an isopropyl group.

Although $R_7$ to $R_9$ in the $COOR_7$ group and $CONR_8R_9$ group can each be arbitrarily selected from the substituents listed above and a hydrogen atom, cases where $R_7$ and $R_8$ each represent a methyl group, and $R_9$ represents a methyl group or a hydrogen atom are preferred from the viewpoint of an affinity for a pigment. Of those, the case where $R_2$ represents a COOH group or a $COOCH_3$ group is particularly preferred.

The azo dye skeleton unit represented by the formula (1) in the polyester is preferably a unit represented by the following formula (7), in terms of an affinity for a pigment.

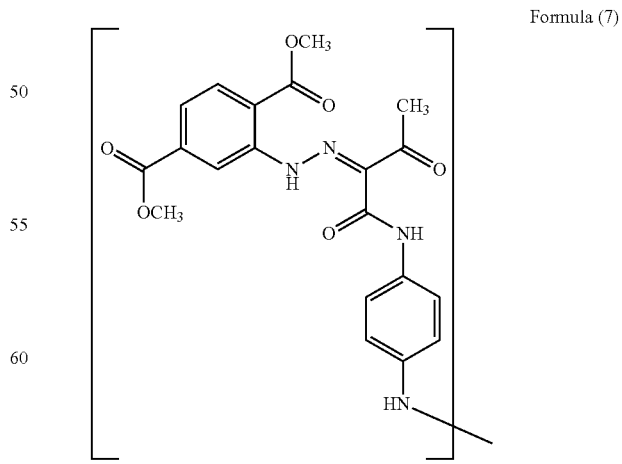

Formula (7)

Next, a site except the unit represented by the above-mentioned formula (1) or (2) in the polyester having an azo dye skeleton of the present invention (which may hereinafter be referred to as "polyester site") is described.

The polyester site may be any one of the polyesters having linear, branched, and crosslinked structures.

The polyester site is preferably a condensation polymer containing monomer units represented by the following formula (3) and the following formula (4), or a condensation polymer containing a monomer unit represented by the following formula (6) from the viewpoint of an affinity for a water-insoluble solvent.

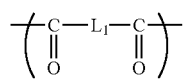

Formula (3)

(In the formula (3), $L_1$ represents a divalent linking group.)

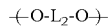

Formula (4)

(In the formula (4), $L_2$ represents a divalent linking group.)

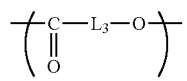

Formula (6)

(In the formula (6), $L_3$ represents a divalent linking group.)

Although $L_1$ in the formula (3) represents a divalent linking group, the case where $L_1$ represents an alkylene group, an alkenylene group, or an arylene group is preferred.

Examples of the alkylene group represented by $L_1$ in the above-mentioned formula (3) include a methylene group, an ethylene group, a trimethylene group, a propylene group, a tetramethylene group, a hexamethylene group, a neopentylene group, a heptamethylene group, an octamethylene group, a nonamethylene group, a decamethylene group, an undecamethylene group, a dodecamethylene group, a 1,3-cyclopentylene group, a 1,3-cyclohexylene group, and a 1,4-cyclohexylene group.

Examples of the alkenylene group represented by $L_1$ in the above-mentioned formula (3) include a vinylene group, a propenylene group, and a 2-butenylene group.

Examples of the arylene group represented by $L_1$ in the above-mentioned formula (3) include a 1,4-phenylene group, a 1,3-phenylene group, a 1,2-phenylene group, a 2,6-naphthylene group, a 2,7-naphthylene group, and a 4,4'-biphenylene group.

The substituent represented by $L_1$ in the above-mentioned formula (3) may be further substituted with a substituent as long as the substitution does not remarkably impair an affinity for a water-insoluble solvent. In this case, examples of the substituent with which the former substituent may be substituted include a methyl group, a halogen atom, a carboxyl group, a trifluoromethyl group, and a combination thereof.

The case where $L_1$ in the above-mentioned formula (3) represents an alkylene group having 6 or more carbon atoms or a phenylene group is preferred from the viewpoint of an affinity for a water-insoluble solvent.

Although $L_2$ in the above-mentioned formula (4) represents a divalent linking group, the case where $L_2$ represents an alkylene group or a phenylene group, or the case where the above-mentioned formula (4) is represented by the following formula (5) is preferred from the viewpoint of an affinity for a water-insoluble solvent.

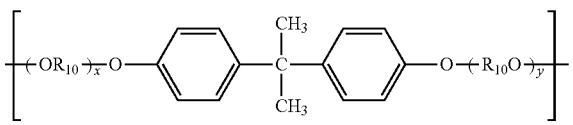

Formula (5)

(In the formula (5), $R_1$ represents an ethylene group or a propylene group, x and y each represents an integer of 0 or more, and the average of x+y is 2 to 10.)

Examples of the alkylene group represented by $L_2$ in the above-mentioned formula (4) include a methylene group, an ethylene group, a trimethylene group, a propylene group, a tetramethylene group, a hexamethylene group, a neopentylene group, a heptamethylene group, an octamethylene group, a nonamethylene group, a decamethylene group, an undecamethylene group, a dodecamethylene group, a 1,3-cyclopentylene group, a 1,3-cyclohexylene group, and a 1,4-cyclohexylene group.

Examples of the phenylene group represented by $L_2$ in the above-mentioned formula (4) include a 1,4-phenylene group, a 1,3-phenylene group, and a 1,2-phenylene group.

The substituent represented by $L_2$ in the above-mentioned formula (4) may be further substituted with a substituent as long as the substitution does not remarkably impair an affinity for a water-insoluble solvent. In this case, examples of the substituent with which the former substituent may be substituted include a methyl group, an alkoxy group, a hydroxyl group, a halogen atom, and a combination thereof.

With regard to the above-mentioned formula (4), the case where the unit represented by the above-mentioned formula (3) is a bisphenol derivative of the unit represented by the above-mentioned formula (4) is preferred from the viewpoint of an affinity for a water-insoluble solvent.

$L_3$ in the above-mentioned formula (6) represents a divalent linking group, and the case where $L_3$ represents an alkylene group or an alkenylene group is preferred.

Examples of the alkylene group represented by $L_3$ in the above-mentioned formula (6) include a methylene group, an ethylene group, a trimethylene group, a propylene group, a tetramethylene group, a hexamethylene group, a neopentylene group, a heptamethylene group, an octamethylene group, a nonamethylene group, a decamethylene group, an undecamethylene group, a dodecamethylene group, and a 1,4-cyclohexylene group.

Examples of the alkenylene group represented by $L_3$ in the above-mentioned formula (6) include a vinylene group, a propenylene group, a butenylene group, a butadienylene group, a pentenylene group, a hexenylene group, a hexadienylene group, a heptenylene group, an octanylene group, a decenylene group, an octadecenylene group, an eicosenylene group, and a triacontenylene group. Those alkenylene groups may each have any of linear, branched, and cyclic structures. In addition, the position of a double bond may be anywhere in the alkenylene group, and the alkenylene group has only to have at least one double bond.

The substituent represented by $L_3$ in the above-mentioned formula (6) may be further substituted with a substituent as long as the substitution does not remarkably impair an affinity for a water-insoluble solvent. In this case, examples of the substituent with which the former substituent may be substituted include an alkyl group, an alkoxy group, a hydroxyl group, a halogen atom, and a combination thereof.

The case where $L_3$ in the above-mentioned formula (6) represents an alkenylene group or an alkylene group having 6 or more carbon atoms is preferred from the viewpoint of an affinity for a water-insoluble solvent.

The polyester having the unit represented by the above-mentioned formula (1) or (2) exerts a higher improving effect on the dispersibility of a pigment as its molecular weight increases. However, too large a molecular weight results in the deterioration of an affinity for a water-insoluble solvent. Therefore, the number average molecular weight (Mn) of the polyester is preferably 500 or more from the viewpoint of an improvement in the dispersibility of the pigment. In addition, the case where the number average molecular weight (Mn) of the polyester is 200,000 or less is preferred. Further, the number average molecular weight of the copolymer more preferably falls within the range of 2,000 to 50,000 in consideration of the ease of producing.

As shown in the following, the azo dye skeleton unit represented by the above-mentioned formula (1) has tautomers represented by, for example, the following formulae (9) and (10). The polyester having an azo dye skeleton of the present invention may contain those tautomers as units.

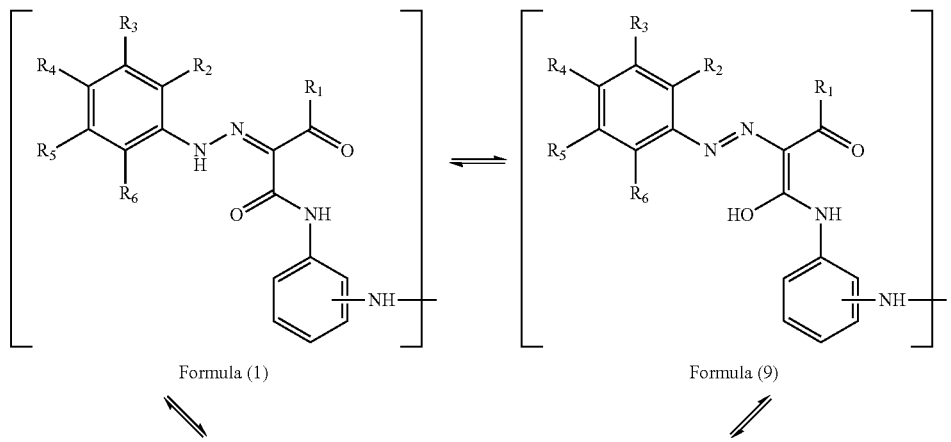

Formula (1)  Formula (9)

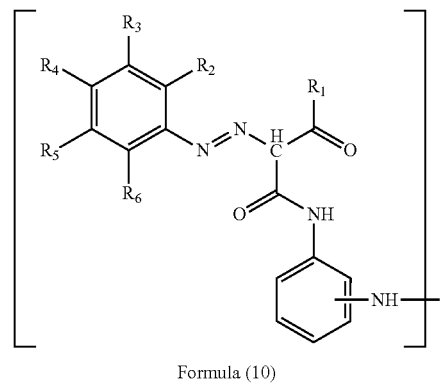

Formula (10)

As shown in the following, the azo dye skeleton unit represented by the above-mentioned formula (2) has tautomers represented by, for example, the following formulae (11) and (12). The polyester having an azo dye skeleton of the present invention may contain those tautomers as units.

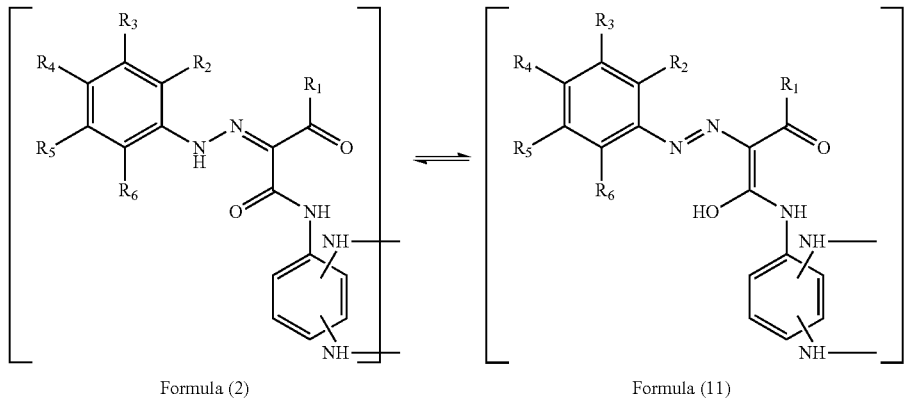

Formula (2)  Formula (11)

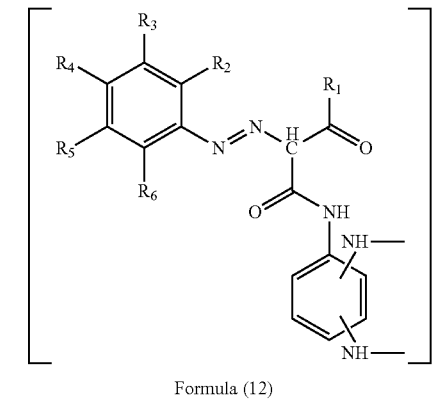

Formula (12)

The azo dye skeleton unit represented by the formula (1) or (2) can be synthesized in accordance with a known method. An example of the synthesis scheme is shown below.

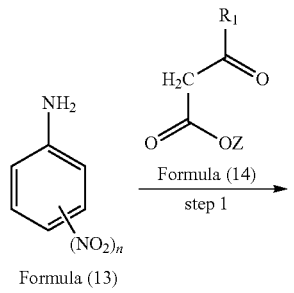

Formula (13)

-continued

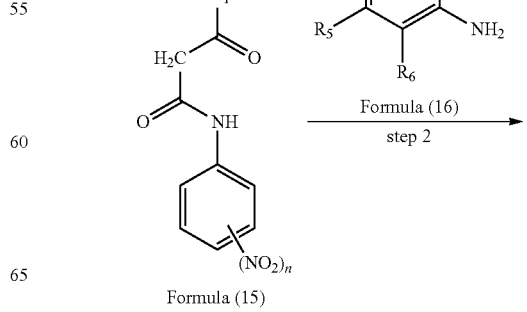

Formula (15)

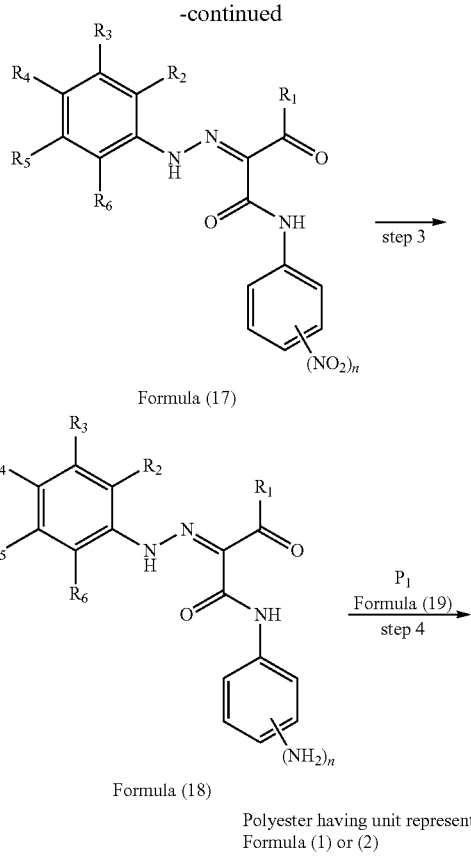

Formula (17)

Formula (18)

Polyester having unit represented by Formula (1) or (2)

($R_1$ and $R_2$ to $R_6$ in the formulae (13) to (18) are identical to $R_1$ and $R_2$ to $R_6$ in the above-mentioned formula (1) or (2), respectively, n represents an integer of 1 or 2, $P_1$ in the formula (19) represents a polyester having a carboxyl group, and Z represents a leaving group.)

In the scheme given above, the polyester having the unit represented by the formula (1) or (2) is synthesized by: the step 1 of amidating a nitroaniline derivative represented by the formula (13) and an acetoacetic acid analog represented by the formula (14) to synthesize an intermediate (15) as an acetoacetanilide analog; the step 2 of subjecting the intermediate (15) and an aniline derivative (16) to diazo coupling to synthesize an azo compound (17); the step 3 of reducing a nitro group in the azo compound (17) to synthesize an intermediate (18) as an aniline analog; and the step 4 of amidating an amino group in the intermediate (18) and a carboxyl group in the separately synthesized polyester $P_1$.

First, the step 1 is described. A known method can be employed in the step 1 (for example, NPL 1). In addition, when $R_1$ in the formula (15) represents a methyl group, the synthesis can be performed by a method involving using diketene in place of the raw material (14) (for example, NPL 2).

Various kinds of each of the nitroaniline derivative (13) and the acetoacetic acid analog (14) described above are commercially available, and hence the derivative and the analog can be easily obtained. In addition, each of the derivative and the analog can be easily synthesized by a known method.

The step 1, which can be performed in the absence of any solvent, is preferably performed in the presence of a solvent in order that abrupt progress of the reaction may be prevented. Examples of the solvent include: alcohols such as methanol, ethanol, and propanol; esters such as methyl acetate, ethyl acetate, and propyl acetate; ethers such as diethyl ether, tetrahydrofuran, and dioxane; hydrocarbons such as benzene, toluene, xylene, hexane, and heptane; halogen-containing hydrocarbons such as dichloromethane, dichloroethane, and chloroform; amides such as N,N-dimethylformamide and N,N-dimethylimidazolidinone; nitriles such as acetonitrile and propionitrile; acids such as formic acid, acetic acid, and propionic acid; and water. In addition, two or more kinds of the above-mentioned solvents can be used as a mixture, and a mixing ratio upon use of the mixture can be arbitrarily determined depending on the solubility of a substrate. The usage of the above-mentioned solvent preferably falls within the range of 1.0 to 20 times as large as the mass of the compound represented by the above-mentioned formula (13) in terms of a reaction rate.

The step is typically performed in the temperature range of 0° C. to 250° C., and is typically completed within 24 hours.

Next, the step 2 is described. A known method can be employed in the step 2. Specifically, the following method is given. First, the aniline derivative (16) is caused to react with a diazotization agent such as sodium nitrite or nitrosylsulfuric acid in a methanol solvent in the presence of an inorganic acid such as hydrochloric acid or sulfuric acid so that the corresponding diazonium salt may be synthesized. Further, the diazonium salt is coupled with the intermediate (15) so that the azo compound (17) may be synthesized.

Various kinds of the above-mentioned aniline derivative (16) are commercially available, and hence the derivative can be easily obtained. In addition, the derivative can be easily synthesized by a known method.

The step 2, which can be performed in the absence of any solvent, is preferably performed in the presence of a solvent in order that abrupt progress of the reaction may be prevented. Any one of the same solvents as those listed for the step 1 is used as the solvent. The usage of the solvent preferably falls within the range of 1.0 to 20 times as large as the mass of the compound represented by the above-mentioned formula (16) in terms of a reaction rate.

The step 2 is typically performed in the temperature range of −50° C. to 100° C., and is typically completed within 24 hours.

Next, the step 3 is described. A known method can be employed in the step 3. As a method involving using a metal compound or the like, there is given a method described in NPL 3. As a catalytic hydrogenation method, there is given a method described in NPL 4, or in PTL 4.

The step 3, which can be performed in the absence of any solvent, is preferably performed in the presence of a solvent in order that abrupt progress of the reaction may be prevented. Any one of the same solvents as those listed for the step 1 is used as the solvent. The usage of the solvent preferably falls within the range of 1.0 to 20 times as large as the mass of the compound represented by the above-mentioned formula (17) in terms of a reaction rate.

The step 3 is typically performed in the temperature range of 0° C. to 250° C., and is typically completed within 24 hours.

Next, the step 4 is described. A known method can be employed in the step 4. As a method involving using a carboxylic chloride as an intermediate, there is given a method described in NPL 5. As a method involving using 1-ethyl-3-(3-dimethylaminopropyl)carbodiimide hydrochloride or the like, there is given a method described in NPL 6.

The step 4, which can be performed in the absence of any solvent, is preferably performed in the presence of a solvent in order that abrupt progress of the reaction may be prevented. Any one of the same solvents as those listed for the step 1 is used as the solvent. The usage of the solvent preferably falls within the range of 1.0 to 20 times as large as the mass of the compound represented by the above-mentioned formula (18) in terms of a reaction rate.

The step 4 is typically performed in the temperature range of 0° C. to 250° C., and is typically completed within 24 hours.

Ordinary methods of isolating and purifying organic compounds can be employed for the compounds represented by the above-mentioned formulae (1), (2), (15), (17), and (18) obtained in the respective steps. Examples of the isolation and purification methods include a recrystallization method and a reprecipitation method each involving using an organic solvent, and column chromatography involving using silica gel or the like. Each of the compounds can be obtained with high purity by performing purification according to one of those methods alone or a combination of two or more thereof.

The compounds represented by the general formulae (15), (17), and (18) were each identified and quantified by nuclear magnetic resonance spectrometry (ECA-400 manufactured by JEOL Ltd.), ESI-TOF MS (LC/MSD TOF manufactured by Agilent Technologies), or HPLC analysis (LC-20A manufactured by Shimadzu Corporation).

The compound represented by the general formula (1) or (2) was identified and quantified by high-speed GPC (HLC8220GPC manufactured by TOSOH CORPORATION), nuclear magnetic resonance spectrometry (ECA-400 manufactured by JEOL Ltd.), or acid value measurement based on JIS K-0070 (automatic titration measuring apparatus COM-2500 manufactured by Hiranuma Sangyo Co., Ltd.).

Next, a method of producing the polyester represented by $P_1$ described above is described. The method of producing the polyester represented by $P_1$ is not particularly limited, and any one of the various conventionally known methods can be employed. For example, when the $P_1$ is formed of the monomer unit represented by the above-mentioned formula (3) and the monomer unit represented by the formula (4), the $P_1$ can be produced by the condensation polymerization of a dicarboxylic acid and a diol in a solvent under an inert gas atmosphere. Alternatively, when the $P_1$ is formed of the monomer unit represented by the above-mentioned formula (6), the $P_1$ can be produced by the condensation polymerization or ring-opening polymerization of a hydroxycarboxylic acid or a lactone in a solvent under an inert gas atmosphere.

In the production of the polyester represented by $P_1$, the polymerization reaction is preferably performed in the presence of a catalyst in order to accelerate the reaction. Examples of the catalyst include antimony trioxide, di-n-butyltin oxide, stannous oxalate, tin di(2-ethylhexanoate), germanium oxide, germanium tetraethoxide, germanium tetrabutoxide, titanium tetraisopropoxide, titanium tetrabutoxide, manganese acetate, zinc di(2-ethylhexanoate), and zinc acetate. The addition amount of those catalysts preferably falls within the range of 0.001 to 0.5 mol % with respect to the polyester to be obtained.

The solvent to be used in the above-mentioned polymerization reaction is preferably one capable of being separated from water generated by the polymerization reaction. There can be used toluene, xylene, mesitylene, 1,2,3,5-tetramethylbenzene, chlorobenzene, 1,2-dichlorobenzene, 1,3-dichlorobenzene, bromobenzene, 1,2-dibromobenzene, 1,3-dibromobenzene, iodobenzene, 1,2-diiodobenzene, diphenyl ether, or dibenzyl ether. Further, two or more kinds of the above-mentioned solvents may be used as a mixture, and a mixing ratio in the case of using such mixture can be arbitrarily determined.

In the above-mentioned polymerization reaction, it is preferred that the solvent to be used is refluxed and water or an alcohol as a by-product of the reaction is removed to the outside of the system in terms of a reaction rate and the degree of polymerization of a polyester to be obtained. Accordingly, the reaction is preferably performed at a temperature around the reflux temperature of the solvent to be used.

In the above-mentioned self-condensation type polymerization reaction, adding a monocarboxylic acid into the reaction system to esterify an unreacted hydroxyl group enables one to control the molecular weight of the polyester and to improve the pigment dispersibility of the polyester when used as a dispersant. A monocarboxylic acid that can be used as a reaction terminator for a hydroxyl group terminal is preferably a branched aliphatic carboxylic acid, and the use of the acid improves the pigment dispersibility.

In the above-mentioned polymerization reaction, an affinity for a dispersion medium can be improved by synthesizing a crosslinked polyester condensation polymer through the addition of a polyvalent carboxylic acid that is trivalent or more, or a polyhydric alcohol that is trihydric or more into the reaction system.

Examples of the polyvalent carboxylic acid that is trivalent or more include 1,2,4-benzenetricarboxylic acid (trimellitic acid), 1,3,5-benzenetricarboxylic acid, 2,5,7-naphthalenetricarboxylic acid, 1,2,4-naphthalenetricarboxylic acid, 1,2,4-butanetricarboxylic acid, 1,2,5-hexanetricarboxylic acid, 1,3-dicarboxyl-2-methyl-2-methylenecarboxypropane, 1,2,4-cyclohexanetricarboxylic acid, 1,2,7,8-octanetetracarboxylic acid, pyromellitic acid, acid anhydrides thereof, and lower alkyl esters thereof.

Examples of the polyhydric alcohol that is trihydric or more include sorbitol, 1,2,3,6-hexanetetrol, 1,4-sorbitan, pentaerythritol, dipentaerythritol, tripentaerythritol, 1,2,4-butanetriol, 1,2,5-pentanetriol, glycerin, 2-methylpropanetriol, 2-methyl-1,2,4-butanetriol, trimethylolethane, trimethylolpropane, and 1,3,5-trihydroxymethylbenzene.

The polyester having an azo dye skeleton of the present invention has a high affinity for an azo pigment, in particular, an acetoacetanilide-based pigment, and has a high affinity for a water-insoluble solvent as well. Accordingly, one kind of such polyesters can be used alone as a pigment dispersant, or a combination of two or more kinds thereof can be used as a pigment dispersant.

In addition, the polyester having an azo dye skeleton of the present invention can be used together with an azo pigment as a pigment composition. The pigment composition of the present invention can be used in a paint, an ink, a toner, or a resin molded product.

Examples of the azo pigment include a monoazo pigment, a bisazo pigment, and a polyazo pigment. Of those, an acetoacetanilide-based pigment typified by a C.I. Pigment Yellow 74, 93, 128, 155, 175, or 180 is preferred because of its good affinity for the pigment dispersant that is the polyester having the unit represented by the above-mentioned formula (1). In particular, the C.I. Pigment Yellow 155 represented by the following formula (8) is more preferred because the pigment is dispersed with the polyester having the unit represented by the above-mentioned formula (1) or (2) to a high effect. One kind of the above-mentioned azo pigments may be used alone, or two or more kinds thereof may be used as a mixture.

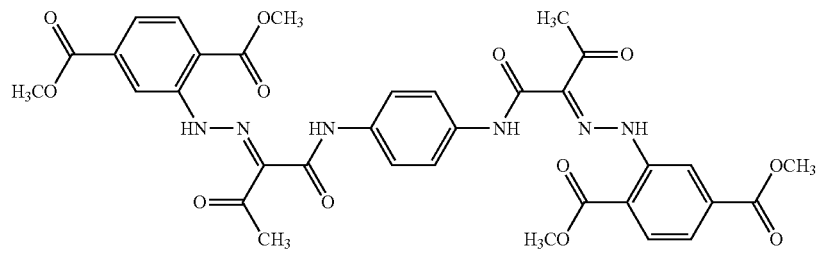

Formula (8)

It should be noted that even a pigment except any such yellow pigment as described above can be suitably used as the azo pigment as long as the pigment has an affinity for the pigment dispersant of the present invention.

Examples of the pigment except any such yellow pigment include: C.I. Pigment Orange 1, 5, 13, 15, 16, 34, 36, 38, 62, 64, 67, 72, or 74; C.I. Pigment Red 2, 3, 4, 5, 12, 16, 17, 23, 31, 32, 41, 47, 48, 48:1, 48:2, 53:1, 57:1, 112, 144, 146, 166, 170, 176, 185, 187, 208, 210, 220, 221, 238, 242, 245, 253, 258, 266, or 269; C.I. Pigment Violet 13, 25, 32, or 50; C.I. Pigment Blue 25 or 26; C.I. Pigment Brown 23; and C.I. Pigment Brown 25.

Those pigments may each be a crude pigment, or may each be a modified pigment composition as long as the pigment composition does not remarkably impair an effect of the pigment dispersant of the present invention.

A weight composition ratio between the pigment and the polyester having an azo dye skeleton in the pigment composition of the present invention falls within the range of preferably 100:1 to 100:100, more preferably 100:10 to 100:50.

The pigment composition of the present invention can be produced by a wet or dry process. In particular, the polyester having the unit represented by the above-mentioned formula (1) is preferably produced by the wet process because the polyester has a high affinity for a water-insoluble solvent. Specifically, the polyester is obtained as described below. The pigment dispersant, and as required, a resin are dissolved in a dispersion medium, and then a pigment powder is gradually added so as to be sufficiently conformed to the dispersion medium while the medium is stirred. Further, a mechanical shear force is applied to the resultant with a dispersing machine such as a kneader, a roll mill, a ball mill, a paint shaker, a dissolver, an attritor, a sand mill, or a high-speed mill so that the pigment may be finely dispersed in a stably uniform fine particulate fashion.

A water-insoluble solvent is preferably used as the dispersion medium that can be used in the pigment composition of the present invention in order that a high dispersing effect of the polyester having the unit represented by the above-mentioned formula (1) on the pigment may be obtained. Examples of the water-insoluble solvent include: esters such as methyl acetate, ethyl acetate, and propyl acetate; hydrocarbons such as hexane, octane, petroleum ether, cyclohexane, benzene, toluene, and xylene; and halogen-containing hydrocarbons such as carbon tetrachloride, trichloroethylene, and tetrabromoethane.

The dispersion medium to be used for the pigment composition may be a polymerizable monomer. Specific examples thereof include styrene, α-methylstyrene, α-ethylstyrene, o-methylstyrene, m-methylstyrene, p-methylstyrene, p-methoxystyrene, p-phenylstyrene, p-chlorostyrene, 3,4-dichlorostyrene, p-ethylstyrene, 2,4-dimethylstyrene, p-n-butylstyrene, p-tert-butylstyrene, p-n-hexylstyrene, p-n-octylstyrene, p-n-nonylstyrene, p-n-decylstyrene, p-n-dodecylstyrene, ethylene, propylene, butylene, isobutylene, vinyl chloride, vinylidene chloride, vinyl bromide, vinyl iodide, vinyl acetate, vinyl propionate, vinyl benzoate, methyl methacrylate, ethyl methacrylate, propyl methacrylate, butyl methacrylate, n-octyl methacrylate, dodecyl methacrylate, 2-ethylhexyl methacrylate, stearyl methacrylate, behenyl methacrylate, phenyl methacrylate, dimethylaminoethyl methacrylate, diethylaminoethyl methacrylate, methyl acrylate, ethyl acrylate, n-butyl acrylate, isobutyl acrylate, propyl acrylate, n-octyl acrylate, dodecyl acrylate, 2-ethylhexyl acrylate, stearyl acrylate, behenyl acrylate, 2-chloroethyl acrylate, phenyl acrylate, vinyl methyl ether, vinyl ethyl ether, vinyl isobutyl ether, vinyl methyl ketone, vinyl hexyl ketone, methyl isopropenyl ketone, vinylnaphthalene, acrylonitrile, methacrylonitrile, and acrylamide.

Examples of the resin which can be used in the pigment composition of the present invention include a polystyrene resin, a styrene copolymer, a polyacrylic acid resin, a polymethacrylic acid resin, a polyacrylic acid ester resin, a polymethacrylic acid ester resin, an acrylic acid ester copolymer, a methacrylic acid ester copolymer, a polyester resin, a polyvinyl ether resin, a polyvinyl alcohol resin, and a polyvinylbutyral resin. Other examples include a polyurethane resin and a polypeptide resin. Further, two or more kinds of those resins may be used as a mixture.

An auxiliary may be further added to the pigment composition of the present invention at the time of its production. Examples of the auxiliary include surface-active agents, pigment and non-pigment dispersants, fillers, standardizers, resins, waxes, defoaming agents, antistatic agents, dust-proof agents, bulking agents, shading colorants, preservatives, drying inhibitors, rheology control additives, wetting agents, antioxidants, UV absorbers, light stabilizers, and combinations thereof. In addition, the pigment dispersant of the present invention may be added in advance upon production of a crude pigment.

The pigment composition of the present invention can be used together with a water-insoluble solvent as a pigment dispersion. The pigment composition may be dispersed in the water-insoluble solvent, or each constituent of the pigment composition may be dispersed in the water-insoluble solvent. Specifically, the pigment dispersion is preferably obtained as described below. The pigment dispersant and a resin are dissolved as required in the dispersion medium, and then a pigment or a pigment composition powder is gradually added so as to be sufficiently conformed to the dispersion medium while the medium is stirred. Further, a mechanical shear force is applied to the resultant with a dispersing machine such as a ball mill, a paint shaker, a dissolver, an attritor, a sand mill, or a high-speed mill. As a result, the pigment can be finely dispersed in a stably uniform fine particulate fashion.

Examples of the water-insoluble solvent which can be used for the pigment dispersion include: esters such as methyl acetate, ethyl acetate, and propyl acetate; hydrocarbons such as hexane, octane, petroleum ether, cyclohexane, benzene, toluene, and xylene; halogen-containing hydrocarbons such as carbon tetrachloride, trichloroethylene, and tetrabromoethane.

The water-insoluble solvent to be used for the pigment dispersion may be a polymerizable monomer. Specific examples thereof include styrene, α-methylstyrene, α-ethylstyrene, o-methylstyrene, m-methylstyrene, p-methylstyrene, p-methoxystyrene, p-phenylstyrene, p-chlorostyrene, 3,4-dichlorostyrene, p-ethylstyrene, 2,4-dimethylstyrene, p-n-butylstyrene, p-tert-butylstyrene, p-n-hexylstyrene, p-n-octylstyrene, p-n-nonylstyrene, p-n-decylstyrene, p-n-dodecylstyrene, ethylene, propylene, butylene, isobutylene, vinyl chloride, vinylidene chloride, vinyl bromide, vinyl iodide, vinyl acetate, vinyl propionate, vinyl benzoate, methyl methacrylate, ethyl methacrylate, propyl methacrylate, butyl methacrylate, n-octyl methacrylate, dodecyl methacrylate, 2-ethylhexyl methacrylate, stearyl methacrylate, behenyl methacrylate, phenyl methacrylate, dimethylaminoethyl methacrylate, diethylaminoethyl methacrylate, methyl acrylate, ethyl acrylate, n-butyl acrylate, isobutyl acrylate, propyl acrylate, n-octyl acrylate, dodecyl acrylate, 2-ethylhexyl acrylate, stearyl acrylate, behenyl acrylate, 2-chloroethyl acrylate, phenyl acrylate, vinyl methyl ether, vinyl ethyl ether, vinyl isobutyl ether, vinyl methyl ketone, vinyl hexyl ketone, methyl isopropenyl ketone, vinylnaphthalene, acrylonitrile, methacrylonitrile, and acrylamide.

The resin that can be used for the pigment dispersion is determined depending on intended applications of the pigment composition, and is not particularly limited. Specific examples thereof include a polystyrene resin, a styrene copolymer, a polyacrylic acid resin, a polymethacrylic acid resin, a polyacrylic acid ester resin, a polymethacrylic acid ester resin, an acrylic acid ester copolymer, a methacrylic acid ester copolymer, a polyester resin, a polyvinyl ether resin, a polyvinyl alcohol resin, and a polyvinylbutyral resin. Other examples include a polyurethane resin and a polypeptide resin. Further, two or more kinds of those resins may be used as a mixture.

Next, a toner is described. The pigment composition of the present invention can be suitably used as a coloring agent for a toner containing toner particles each having a binding resin, a coloring agent, and a releasing agent (wax component). The use of the pigment composition of the present invention can provide a toner having a good tone because the use satisfactorily maintains the dispersibility of the pigment in toner particle.

Examples of the binding resin for the toner include a styrene-methacrylic acid copolymer, a styrene-acrylic acid copolymer, a polyester resin, an epoxy resin, and a styrene-butadiene copolymer. In a method of directly obtaining the toner particles by a polymerization method, a monomer for forming the particles is used. Specific examples thereof include styrene-based monomers such as styrene, α-methylstyrene, α-ethylstyrene, o-methylstyrene, m-methylstyrene, p-methylstyrene, o-ethylstyrene, m-ethylstyrene, and p-ethylstyrene, methacrylate-based monomers such as methyl methacrylate, ethyl methacrylate, propyl methacrylate, butyl methacrylate, octyl methacrylate, dodecyl methacrylate, stearyl methacrylate, behenyl methacrylate, 2-ethylhexyl methacrylate, dimethylaminoethyl methacrylate, diethylaminoethyl methacrylate, methacrylonitrile, and methacrylamide, acrylate-based monomers such as methyl acrylate, ethyl acrylate, propyl acrylate, butyl acrylate, octyl acrylate, dodecyl acrylate, stearyl acrylate, behenyl acrylate, 2-ethylhexyl acrylate, dimethylaminoethyl acrylate, diethylaminoethyl acrylate, acrylonitrile, and acrylamide, and olefin-based monomers such as butadiene, isoprene, and cyclohexene. Those monomers are used alone, or as an appropriate mixture thereof that exhibits a theoretical glass transition temperature (Tg) in the range of 40 to 75° C. (see NPL 7). When a non-polar resin such as polystyrene and a polar resin such as a polyester resin or a polycarbonate resin are used in combination as the binding resin of the toner, the distribution of the additive such as the coloring agent, a charge control agent, or the wax in the toner can be controlled. For example, when the toner particles are directly produced by a suspension polymerization method or the like, the polar resin is added at the time of a polymerization reaction commencing on a dispersing step and ending on a polymerizing step. The polar resin is added depending on a balance between the polarity of a polymerizable monomer composition serving as a toner particle and that of an aqueous medium. As a result, the concentration of the polar resin can be controlled so as to change from the surface of each toner particle toward its center in, for example, the following continuous fashion. The resin forms a thin layer on the surface of the toner particle. At this time, the use of such a polar resin as to have an interaction with the coloring agent containing the pigment composition of the present invention or with the charge control agent can make a state in which the above-mentioned coloring agent is present in each toner particle a desirable one.

Further, in the present invention, a crosslinking agent can be used at the time of the synthesis of the binding resin for improving the mechanical strength of each toner particle, and at the same time, for controlling the molecular weight of the polymer that forms the toner particle.

As a bifunctonal crosslinking agent, there are given divinylbenzene, bis(4-acryloxypolyethoxyphenyl)propane, ethylene glycol diacrylate, 1,3-butylene glycol diacrylate, 1,4-butanediol diacrylate, 1,5-pentanediol diacrylate, 1,6-hexanediol diacrylate, neopentyl glycol diacrylate, diethylene glycol diacrylate, triethylene glycol diacrylate, tetraethylene glycol diacrylate, diacrylates of polyethylene glycols #200, #400, and #600, dipropylene glycol diacrylate, polypropylene glycol diacrylate, polyester-type diacrylates, and ones obtained by changing those diacrylates to dimethacrylates.

As a polyfunctional crosslinking agent, there are given pentaerythritol triacrylate, trimethylolethane triacrylate, trimethylolpropane triacrylate, tetramethylolmethane tetraacrylate, oligoester acrylate and methacrylate thereof, 2,2-bis(4-mathacryloxyphenyl)propane, diallyl phthalate, triallyl cyanurate, triallyl isocyanurate, and triallyl trimellitate.

Any such crosslinking agent is used in an amount in the range of preferably 0.05 to 10 parts by mass, more preferably 0.1 to 5 parts by mass with respect to 100 parts by mass of the above-mentioned monomer in terms of the offset resistance and the fixability of the toner.

Any other coloring agent can be used in combination with the pigment composition of the present invention as the coloring agent of the toner as long as the other coloring agent does not impair the dispersibility of the pigment composition of the present invention.

Examples of the coloring agent which can be used in combination include: C.I. Pigment Yellow 12, 13, 14, 15, 17, 62, 83, 94, 95, 97, 109, 110, 111, 120, 127, 129, 147, 151, 154, 168, 174, 176, 181, 191, 194, 213, or 214; C.I. Vat yellow 1, 3, or 20; Mineral Fast Yellow; Naples Yellow; Naphthol Yellow S; Hansa Yellow G; Permanent Yellow NCG; and C.I. Solvent Yellow 9, 17, 24, 31, 35, 58, 93, 100, 102, 103, 105, 112, 162, or 163.

Examples of the wax component include: petroleum-based wax and derivatives thereof such as paraffin wax, microcrystalline wax, and petrolatum; montan wax and derivatives thereof; hydrocarbon wax and derivatives thereof by a Fischer-Tropsch process; polyolefin wax and derivatives thereof typified by polyethylene; and natural wax and derivatives thereof such as carnauba wax and candelilla wax. The derivatives include an oxide, and a block copolymer with a vinyl monomer, and a graft modified product. Further examples include: alcohols such as higher aliphatic alcohols; fatty acids such as stearic acid and palmitic acid; fatty acid amides; fatty acid esters; hardened castor oil and derivatives thereof; plant wax; and animal wax. One kind of those wax components may be used alone, or two or more kinds thereof may be used in combination.

The total content of the above-mentioned wax component falls within the range of preferably 2.5 to 15.0 parts by mass, more preferably 3.0 to 10.0 parts by mass with respect to 100 parts by mass of the binding resin.

The toner can be mixed with a charge control agent as required before its use. The mixing enables one to control the triboelectric charge quantity of the toner to an optimum one in accordance with a developing system.

A known agent can be utilized as the charge control agent, and a charge control agent which can be charged at a high speed and which is capable of stably maintaining a certain charge quantity is particularly preferred. Further, when the toner particles are directly produced by a polymerization method, a charge control agent having low polymerization-inhibiting property and substantially free of any matter solubilized in an aqueous dispersion medium is particularly preferred.

Examples of the charge control agent that can control the toner so as to have a negative charge include a polymer or copolymer having a sulfonic acid group, a sulfonic acid salt group, or a sulfonic acid ester group, a salicylic acid derivative and a metal complex thereof, a monoazo metal compound, an acetylacetone metal compound, an aromatic oxycarboxylic acid, aromatic mono- and polycarboxylic acids and metal salts, anhydrides, and esters thereof, phenol derivatives such as bisphenol, a urea derivative, a metal-containing naphthoic acid-based compound, a boron compound, a quaternary ammonium salt, a calixarene, and a resin-based charge control agent. In addition, examples of the charge control agent that can control the toner so as to have a positive charge include: nigrosine-modified products with nigrosine, fatty acid metal salts, and the like; guanidine compounds; imidazole compounds; quaternary ammonium salts such as tributylbenzylammonium 1-hydroxy-4-naphthosulfonate and tetrabutylammonium tetrafluoroborate, and analogs thereof including onium salts such as phosphonium salts and lake pigments thereof; triphenylmethane dyes and lake pigments thereof (laking agents include phosphorus tungstate, phosphorus molybdate, phosphorus tungsten molybdate, tannic acid, lauric acid, gallic acid, ferricyanides, and ferrocyanides); metal salts of higher fatty acids; diorganotin oxides such as dibutyl tin oxide, dioctyl tin oxide, and dicyclohexyl tin oxide; diorganotin borates such as dibutyl tin borate, dioctyl tin borate, and dicyclohexyl tin borate; and a resin-based charge control agent. One kind of those charge control agents may be used alone, or two or more kinds thereof may be used in combination.

An inorganic fine powder may be added as a flowability-imparting agent to the toner. Silica, titanium oxide, alumina, or a multiple oxide thereof, or a product obtained by treating the surface of any such oxide can be used as the inorganic fine powder.

A method of producing the toner particles that form the toner is, for example, a pulverization method, a suspension polymerization method, a suspension granulation method, or an emulsion polymerization method. Of those production methods, a production method involving granulation in an aqueous medium such as the suspension polymerization method or the suspension granulation method is particularly preferred from the viewpoints of an environmental load at the time of the production and the controllability of a particle size.

In the suspension polymerization method, the toner particles are produced as described below. First, the coloring agent containing the pigment composition, the polymerizable monomer, the wax component, a polymerization initiator, and the like are mixed so that a polymerizable monomer composition may be prepared. Next, the polymerizable monomer composition is dispersed in the aqueous medium so that the polymerizable monomer composition may be granulated into particles. Then, the polymerizable monomer in each particle of the polymerizable monomer composition is polymerized in the aqueous medium so that the toner particles may be obtained.

The polymerizable monomer composition is preferably a composition prepared by mixing a dispersion liquid, which is obtained by dispersing the coloring agent in a first polymerizable monomer, with a second polymerizable monomer. The dispersed state of the pigment in each toner particle is improved by sufficiently dispersing the coloring agent with the first polymerizable monomer and then mixing the resultant with the second polymerizable monomer together with any other toner material.

A known polymerization initiator can be given as the polymerization initiator to be used in the suspension polymerization method, and examples of the polymerization initiator include an azo compound, an organic peroxide, an inorganic peroxide, an organometallic compound, and a photopolymerization initiator. Specific examples thereof include: azo-based polymerization initiators such as 2,2'-azobis(isobutyronitrile), 2,2'-azobis(2-methylbutyronitrile), 2,2'-azobis(4-methoxy-2,4-dimethylvaleronitrile), 2,2'-azobis(2,4-dimethylvaleronitrile), and dimethyl 2,2'-azobis (isobutyrate); organic peroxide-based polymerization initiators such as benzoyl peroxide, di-tert-butyl peroxide, tert-butylperoxyisopropyl monocarbonate, tert-hexylperoxy benzoate, and tert-butylperoxy benzoate; inorganic peroxide-based polymerization initiators such as potassium persulfate and ammonium persulfate; and redox initiators such as hydrogen peroxide-ferrous-based, BPO-dimethylaniline-based, and cerium (IV) salt-alcohol-based redox initiators. Examples of the photopolymerization initiator include acetophenone-based, benzoin ether-based, and ketal-based photopolymerization initiators. The polymerization initiators may be used alone, or in combination of two or more thereof.

The case where the concentration of the polymerization initiator falls within the range of 0.1 to 20 parts by mass with respect to 100 parts by mass of the polymerizable monomer is preferred. The case where the concentration falls within the range of 0.1 to 10 parts by mass is more preferred.

A dispersion stabilizer is preferably incorporated into the aqueous medium to be used in the suspension polymerization method. As an inorganic dispersion stabilizer, there are given calcium phosphate, magnesium phosphate, aluminum phosphate, zinc phosphate, magnesium carbonate, calcium carbonate, calcium hydroxide, magnesium hydroxide, aluminum hydroxide, calcium metasilicate, calcium sulfate, barium sulfate, bentonite, silica, and alumina. As an organic dispersion stabilizer, there are given polyvinyl alcohol, gelatin, methylcellulose, methylhydroxypropylcellulose, ethylcellulose, a sodium salt of carboxymethylcellulose, and starch. In addition, nonionic, anionic, and cationic surfactants can also be used, and examples thereof include sodium dodecyl sulfate, sodium tetradecyl sulfate, sodium pentadecyl sulfate, sodium octyl sulfate, sodium oleate, sodium laurate, potassium stearate, and calcium oleate.

Of the dispersion stabilizers, a hardly water-soluble, inorganic dispersion stabilizer that is soluble in an acid is preferably used. In addition, when an aqueous dispersion medium is prepared with the hardly water-soluble, inorganic dispersion stabilizer, such dispersion stabilizer is preferably used at a ratio in the range of 0.2 to 2.0 parts by mass with respect to 100 parts by mass of the polymerizable monomer in terms of the droplet stability of the polymerizable monomer composition in the aqueous medium. In addition, the aqueous medium is preferably prepared with water whose amount ranges from 300 to 3,000 parts by mass with respect to 100 parts by mass of the polymerizable monomer composition.

When the aqueous medium in which the hardly water-soluble, inorganic dispersion stabilizer is dispersed is prepared, the preparation is preferably performed by producing the hardly water-soluble, inorganic dispersion stabilizer in water under high-speed stirring in order that fine dispersion stabilizer particles having a uniform grain size may be obtained. For example, when calcium phosphate is used as a dispersion stabilizer, a preferred dispersion stabilizer can be obtained by forming calcium phosphate fine particles through the mixing of an aqueous solution of sodium phosphate and an aqueous solution of calcium chloride under high-speed stirring.

The suspension granulation method is also preferably employed as a method for obtaining the toner particles. As no heating step is included in the production steps of the suspension granulation method, the compatibilization of the resin and the wax component that occurs when a low-melting wax is used is suppressed, and hence a reduction in the glass transition temperature of the toner resulting from the compatibilization can be prevented. In addition, the suspension granulation method offers a wide choice of toner materials each serving as the binding resin, and facilitates the use of a polyester resin generally credited with being advantageous for fixability as a main component. Accordingly, the suspension granulation method is a production method advantageous when a toner of such resin composition that the suspension polymerization method cannot be applied is produced.

In the suspension granulation method, the toner particles are produced as described below. First, the coloring agent containing the pigment composition, the binding resin, the wax component, and the like are mixed in a solvent so that a solvent composition may be prepared. Next, the solvent composition is dispersed in an aqueous medium so that the solvent composition may be granulated into particles. Thus, a toner particle suspension is obtained. Then, the solvent is removed from the resultant suspension by heating or decompression so that the toner particles may be obtained.

The solvent composition is preferably a composition prepared by mixing a dispersion liquid, which is obtained by dispersing the above-mentioned coloring agent in a first solvent, with a second solvent. That is, the dispersed state of the pigment in each toner particle is improved by sufficiently dispersing the coloring agent with the first solvent and then mixing the resultant with the second solvent together with any other toner material.

Examples of the solvent which can be used in the suspension granulation method include hydrocarbons such as toluene, xylene, and hexane, halogen-containing hydrocarbons such as methylene chloride, chloroform, dichloroethane, trichloroethane, and carbon tetrachloride; alcohols such as methanol, ethanol, butanol, and isopropyl alcohol, polyhydric alcohols such as ethylene glycol, propylene glycol, diethylene glycol, and triethylene glycol; cellosolves such as methyl cellosolve and ethyl cellosolve, ketones such as acetone, methyl ethyl ketone, and methyl isobutyl ketone; ethers such as benzyl alcohol ethyl ether, benzyl alcohol isopropyl ether, and tetrahydrofuran; and esters such as methyl acetate, ethyl acetate, and butyl acetate. Those may be used alone, or as a mixture of two or more kinds thereof. Of those, a solvent having a low boiling point and capable of sufficiently dissolving the above-mentioned binding resin is preferably used in order that the solvent in the above-mentioned toner particle suspension may be easily removed.

The case where the usage of the above-mentioned solvent falls within the range of 50 to 5,000 parts by mass with respect to 100 parts by mass of the binding resin is preferred. The case where the usage falls within the range of 120 to 1,000 parts by mass is more preferred.

A dispersion stabilizer is preferably incorporated into the aqueous medium to be used in the suspension granulation method. The same dispersion stabilizer as that used in the suspension polymerization method is used as the dispersion stabilizer.

The case where the usage of the dispersion stabilizer falls within the range of 0.01 to 20 parts by mass with respect to 100 parts by mass of the binding resin is preferred in terms of the droplet stability of the solvent composition in the aqueous medium.

The toner has a weight average particle diameter (hereinafter, described as "D4") in the range of preferably 3.00 to 15.0 pm, more preferably 4.00 to 12.0 μm.

A ratio of the D4 of the toner to the number average particle diameter (hereinafter, described as "D1") of the toner (hereinafter, described as "D4/D1") is desirably 1.35 or less, preferably 1.30 or less.

Methods of adjusting the D4 and D1 of the toner vary depending on a method of producing the toner particles. In the case of, for example, the suspension polymerization method, the adjustment can be performed by controlling the concentration of the dispersant used at the time of the preparation of the aqueous dispersion medium, a reaction stirring speed or a reaction stirring time, or the like.

When a magnetic toner is to be obtained, a magnetic material is incorporated into each toner particle.

Examples of the magnetic material include: iron oxides such as magnetite, maghemite, and ferrite or iron oxides containing other metal oxides, metals such as Fe, Co, and Ni or alloys of these metals and metals such as Al, Co, Cu, Pb, Mg, Ni, Sn, Zn, Sb, Be, Bi, Cd, Ca, Mn, Se, Ti, W, and V, and mixtures thereof.

EXAMPLES

The present invention is described in more detail by way of examples and comparative examples. It should be noted that the terms "part(s)" and "%" in the description in the examples refer to "part(s) by mass" and "mass %," respectively unless otherwise stated.

Measurement methods to be employed in the examples are described below.

(1) Molecular Weight Measurement

The molecular weights of a polyester and a polyester having an azo dye skeleton unit to be used in the present invention are calculated by size exclusion chromatography (SEC) in terms of polystyrene. Molecular weight measurement by SEC is described below.

A sample is added to the following eluent so that a sample concentration may be 1.0 mass %. The mixture is left at rest at room temperature for 24 hours. The resultant solution is filtered with a solvent-resistant membrane filter having a pore size of 0.2 μm. The resultant filtrate is defined as a sample solution. Then, the sample solution is subjected to measurement under the following conditions.

Apparatus: A high-speed GPC apparatus (HLC-8220GPC) (manufactured by TOSOH CORPORATION)
Column: Twin TSKgel α-M (manufactured by TOSOH CORPORATION)
Eluent: DMF (20 mM, containing LiBr)
Flow rate: 1.0 ml/min
Oven temperature: 40° C.
Sample injection amount: 0.10 ml In the calculation of the molecular weight of the sample, a molecular weight calibration curve prepared with standard polystyrene resins (TSK standard polystyrenes F-850, F-450, F-288, F-128, F-80, F-40, F-20, F-10, F-4, F-2, F-1, A-5000, A-2500, A-1000, and A-500 manufactured by Tosoh Corporation) is used.

(2) Acid Value Measurement

The acid value of the polyester is determined by the following method.

Basic operations are based on JIS K-0070.
1) 0.5 to 2.0 Grams of a sample are precisely weighed. The mass at this time is represented by W (g).
2) The sample is loaded into a 300-ml beaker, and 150 ml of a mixed liquid of toluene and ethanol (4/1) are added to dissolve the sample.
3) The resultant solution is titrated with a 0.1-mol/l solution of KOH in ethanol by using a potentiometric titration measuring apparatus (for example, an automatic titration measuring apparatus COM-2500 manufactured by Hiranuma Sangyo Co., Ltd. can be utilized).
4) The usage of the KOH solution at the time is represented by S (ml). Blank measurement is simultaneously performed, and the usage of the KOH solution at this time is represented by B (ml).
5) The acid value is calculated from the following equation where f represents the factor of the KOH solution.

$$\text{Acid value[mg KOH/g]} = \frac{(S-B) \times f \times 5.61}{W}$$

(3) Composition Analysis

The structures of a polyester and a polyester having an azo dye skeleton unit in the examples were determined with the following apparatus.
$^1$H NMR (ECA-400 manufactured by JEOL Ltd. (solvent used: heavy chloroform))

Example 1

Polyester resins were obtained by the following methods.

Synthesis Example 1 of Polyester Resin

A resin (A) containing a monomer unit represented by the formula (3) where $L_1$ represented a p-phenylene group and a monomer unit represented by the formula (5) (where $R_{10}$ represented an ethylene group, and x and y each represented 1) was produced in accordance with the following method.

In a four-necked flask, 31.6 g of oxyethylenated bisphenol A, 14.8 g of terephthalic acid, 5.5 g of glycerin as a crosslinking agent, and 0.5 mg of di-n-butyltin oxide as a catalyst were melted under heating at 200° C. and stirred while a nitrogen gas was introduced as an inert gas. After the completion of the discharge of water as a by-product, the temperature of the resultant was increased to 230° C. over about 1 hour, and then the resultant was stirred under heating for 2 hours. Then, a resin was taken out in a molten state. The resin was cooled at normal temperature and washed with water. Thus, the resin (A) was obtained. The physical properties of the resin (A) were measured by the above-mentioned methods. Measured results are shown below.

(Results of Analysis of Resin (A))
Results of Molecular Weight Measurement (GPC):
   Weight average molecular weight (Mw)=10,508, number average molecular weight (Mn)=3,543
Result of Acid Value Measurement:
   11.6 mgKOH/g
Results of $^1$H NMR (400 MHz, CDCl$_3$, room temperature):
   δ [ppm]=8.06 (3.7H, s), 7.15 (4H, d), 6.89 (4H, d), 5.48-5.32 (0.6H, m), 4.72-3.63 (2.4H, m), 1.68 (6H, s), 1.47 (4H, d), 1.42-1.22 (4H, m)

Synthesis Example 2 of Polyester Resin

A resin (B) containing a monomer unit derived from 12-hydroxystearic acid was produced in accordance with the following method.

200 Parts of 12-hydroxystearic acid, 8.24 parts of stearic acid for sealing a hydroxyl group terminal, and 56.8 parts of xylene were loaded into a four-necked flask, and were then dissolved under heating at 140° C. 0.485 Part of titanium tetraisopropoxide was added as a catalyst to the mixed liquid, and then the temperature of the liquid was increased to 180° C. The liquid was stirred for 42 hours while the liquid temperature was held and water as a by-product of the reaction was removed. After the completion of the reaction, xylene was removed by distillation, and then the remainder was dried under reduced pressure. Thus, the resin (B) was obtained. The physical properties of the resin (B) were measured by the above-mentioned methods. Measured results are shown below.

(Results of Analysis of Resin (B))
Results of Molecular Weight Measurement (GPC):
   Weight average molecular weight (Mw)=5,069, number average molecular weight (Mn)=2,636
Result of Acid Value Measurement:
   31.9 mgKOH/g
Results of $^1$H NMR (400 MHz, CDCl$_3$, room temperature):
   δ [ppm]=4.99 (1H, m), 2.19 (2H, t), 2.10 (0.5H, t), 1.61-1.42 (7H, m), 1.28-1.15 (28H, m), 0.88 (4H, t)

Synthesis Example 3 of Polyester Resin

A resin (C) containing a monomer unit derived from ε-caprolactone was produced in accordance with the following method.

16.4 Parts of ε-caprolactone and 2.0 parts of α-linolenic acid for sealing a hydroxyl group terminal were stirred and mixed in a four-necked flask. The temperature of the resultant liquid was increased to 140° C. so that the contents were melted under heating. 0.04 Part of titanium tetraisopropoxide was added as a catalyst to the mixed liquid, and then the liquid was stirred for 17 hours. The temperature of the liquid was increased to 180° C., and then the liquid was stirred for an additional 17 hours. After the completion of the reaction, the resultant was diluted with THF and reprecipitated with methanol, and then the deposited precipitate was separated by filtration. Thus, the resin (C) was obtained. The physical properties of the resin (C) were measured by the above-mentioned methods. Measured results are shown below.

(Results of Analysis of Resin (C))

Results of Molecular Weight Measurement (GPC):

Weight average molecular weight (Mw)=12,128, number average molecular weight (Mn)=2,354

Result of Acid Value Measurement:

10.3 mgKOH/g

Results of $^1$H NMR (400 MHz, CDCl$_3$, room temperature): δ [ppm]=5.37-5.29 (6H, m), 5.00-4.94 (0.2H, m), 4.21 (0.8H, t), 4.03 (140H, t), 3.84 (1H, t), 3.62 (0.4H, t), 2.79-2.72 (4H, m), 2.43 (1H, t), 2.27 (140H, t), 2.06 (8H, t), 1.62 (280H, m), 1.33 (210H, m), 1.19 (3H, m)

Resins (D) to (H) described in Table 1 below were obtained by methods in conformity with the above-mentioned resins (A) to (C). Results are shown below.

TABLE 1
Resins (A) to (H)
| Resin No. | Resin Composition | | | OH group- | Mw |
|---|---|---|---|---|---|
| | Monomer unit A | Monomer unit B | Crosslinking agent | sealing agent | |
| Resin (A) | 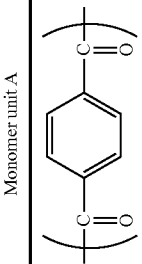 |  | Glycerin | None | 10,508 |
| Resin (B) |  | None | None | Stearic acid | 5,069 |
| Resin (C) | 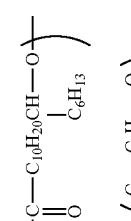 | None | None | α-Linolenic acid | 12,128 |
| Resin (D) |  | 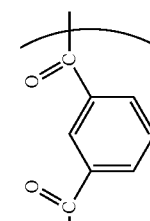 | Trimellitic acid | None | 9,854 |
| Resin (E) |  | $+O-C_{10}H_{20}-O+$ | None | None | 18,240 |
| Resin (F) | 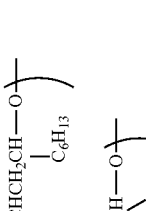 | None | None | Oleic acid | 6,996 |
| Resin (G) |  | None | None | None | 11,256 |

TABLE 1-continued

| Resin No. | Resins (A) to (H) | | | |
|---|---|---|---|---|
| | Resin Composition | | Crosslinking agent | OH group-sealing agent | Mw |
| | Monomer unit A | Monomer unit B | | | |
| Resin (H) | ![structure] | $-(O-C_4H_8-O)-$ | None | None | 16,550 |

Example 2

Polyesters each having an azo dye skeleton unit represented by the formula (1) or (2) were obtained by the following methods.

Synthesis Example 1 of Polyester Having Azo Dye Skeleton Unit

A polyester (26) having an azo dye skeleton unit represented by the following structure was produced in accordance with the following scheme.

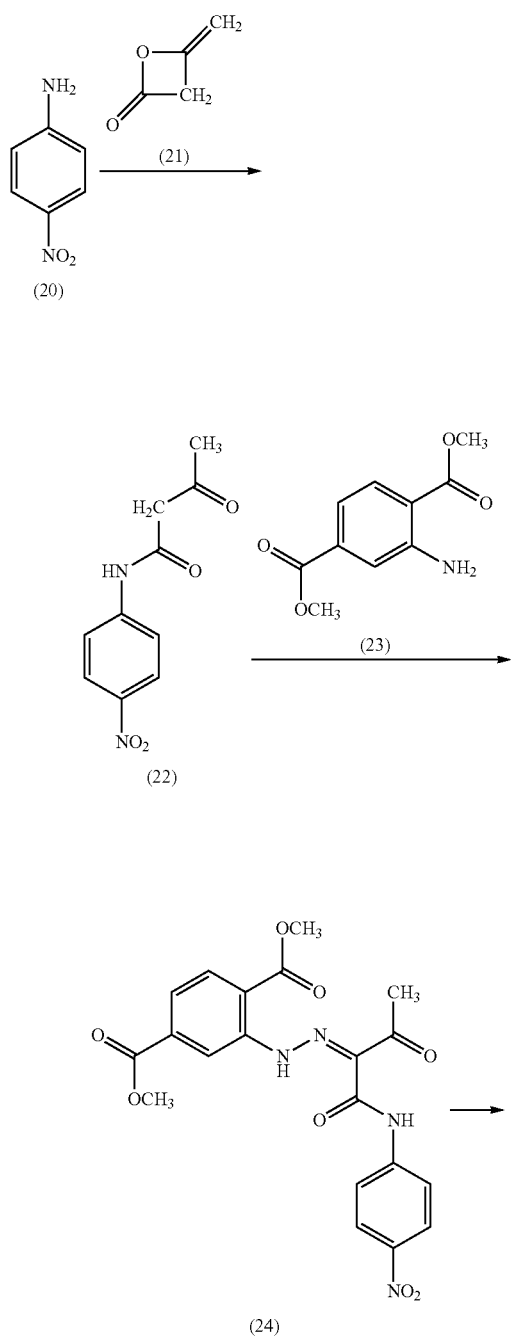

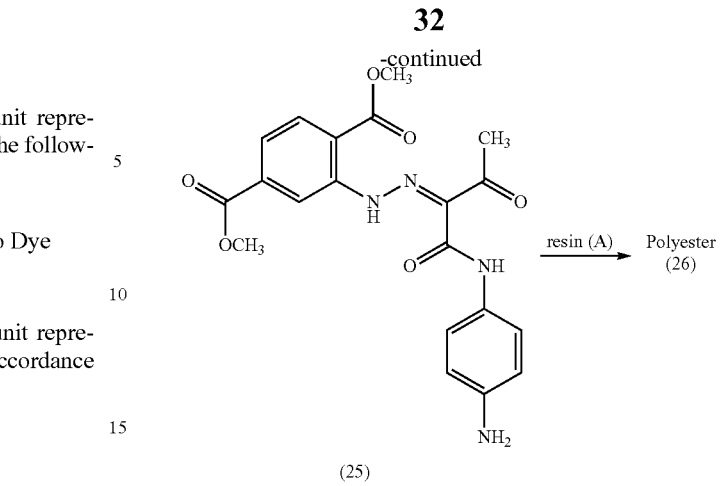

3.11 Parts of p-nitroaniline (20) were added to 30 parts of chloroform. The resultant mixture was cooled with ice to 10° C. or less, and then 1.89 parts of diketene (21) were added to the mixture. After that, the resultant was stirred at 65° C. for 2 hours. After the completion of the reaction, the resultant was extracted with chloroform and concentrated. Thus, 4.80 parts of a compound (22) were obtained (in 96.0% yield).

40.0 Parts of methanol and 5.29 parts of concentrated hydrochloric acid were added to 4.25 parts of dimethyl 2-aminoterephthalate (23), and then the mixture was cooled with ice to 10° C. or less. A solution prepared by dissolving 2.10 parts of sodium nitrite in 6.00 parts of water was added to the resultant solution, and then the mixture was subjected to a reaction at the same temperature for 1 hour. Next, 0.990 part of sulfamic acid was added to the resultant, and then the mixture was stirred for an additional 20 minutes (diazonium salt solution). 4.51 Parts of the above-mentioned compound (22) were added to 70.0 parts of methanol. The resultant mixture was cooled with ice to 10° C. or less, and then the above-mentioned diazonium salt solution was added to the mixture. After that, a solution prepared by dissolving 5.83 parts of sodium acetate in 7.00 parts of water was added to the resultant, and then the mixture was subjected to a reaction at 10° C. or less for 2 hours. After the completion of the reaction, 300 parts of water were added to the resultant, and then the mixture was stirred for 30 minutes. After that, the solid was separated by filtration and purified by a recrystallization method from N,N-dimethylformamide. Thus, 8.65 parts of a compound (24) were obtained (in 96.1% yield).

8.58 Parts of the above-mentioned compound (24) and 0.4 part of palladium-activated carbon (palladium: 5%) were added to 150 parts of N,N-dimethylformamide, and then the mixture was stirred under a hydrogen gas atmosphere (reaction pressure: 0.1 to 0.4 MPa) at 40° C. for 3 hours. After the completion of the reaction, the solution was separated by filtration and concentrated. Thus, 7.00 parts of a compound (25) were obtained (in 87.5% yield).

1.27 Parts of the compound (25) were added to 200 parts of dry tetrahydrofuran, and then the mixture was heated to 80° C. so that the compound was dissolved. After the dissolution, the temperature of the solution was reduced to 50° C., and then 18.8 parts of the resin (A) dissolved in 30 parts of dry tetrahydrofuran were added to the solution. 3.0 Parts of 1-ethyl-3-(3-dimethylaminopropyl)carbodiimide.hydrochloride (EDC.HCl) were added to the mixture, and then the whole was stirred at 50° C. for 5 hours. The temperature of the resultant liquid was gradually returned to normal temperature, and then the liquid was stirred overnight so that a reaction was completed. After the completion of the reaction, the resultant solution was concentrated and extracted with chloroform, and then the organic phase was washed with water. After that, the solution was concentrated and purified by recrystallization with methanol. Thus, the polyester (26) having an azo dye skeleton unit was obtained. The fact that the resultant polyester had the structure represented by the above-mentioned formula was confirmed with each apparatus described above. Results of analysis are shown below. In addition, FIG. 1 shows the $^1$H NMR spectrum of the polyester (26) having an azo dye skeleton unit.

(Results of Analysis of Polyester (26) Having Azo Dye Skeleton Unit)
Results of Molecular Weight Measurement (GPC):
  Weight average molecular weight (Mw)=15,083, number average molecular weight (Mn)=7,337
Result of Acid Value Measurement:
  0.150 mgKOH/g
Results of $^1$H NMR (400 MHz, CDCl$_3$, room temperature) (see FIG. 1):
  δ [ppm]=15.62 (s, 1H), 11.42 (s, 1H), 8.60 (s, 1H), 8.02 (m, 166H), 7.13 (m, 178H), 6.81 (m, 178H), 5.49-5.29 (m, 76H), 4.71 (m, 7H), 4.44 (m, 24H), 3.91 (m, 228H), 2.68 (s, 3H), 1.60-1.22 (m, 630H)

The above-mentioned results of analysis showed that the ratio at which the azo dye skeleton unit was introduced into the carboxyl groups of the resin (A) was 98.7%.

Synthesis Example 2 of Polyester Having Azo Dye Skeleton Unit

Figure 2:
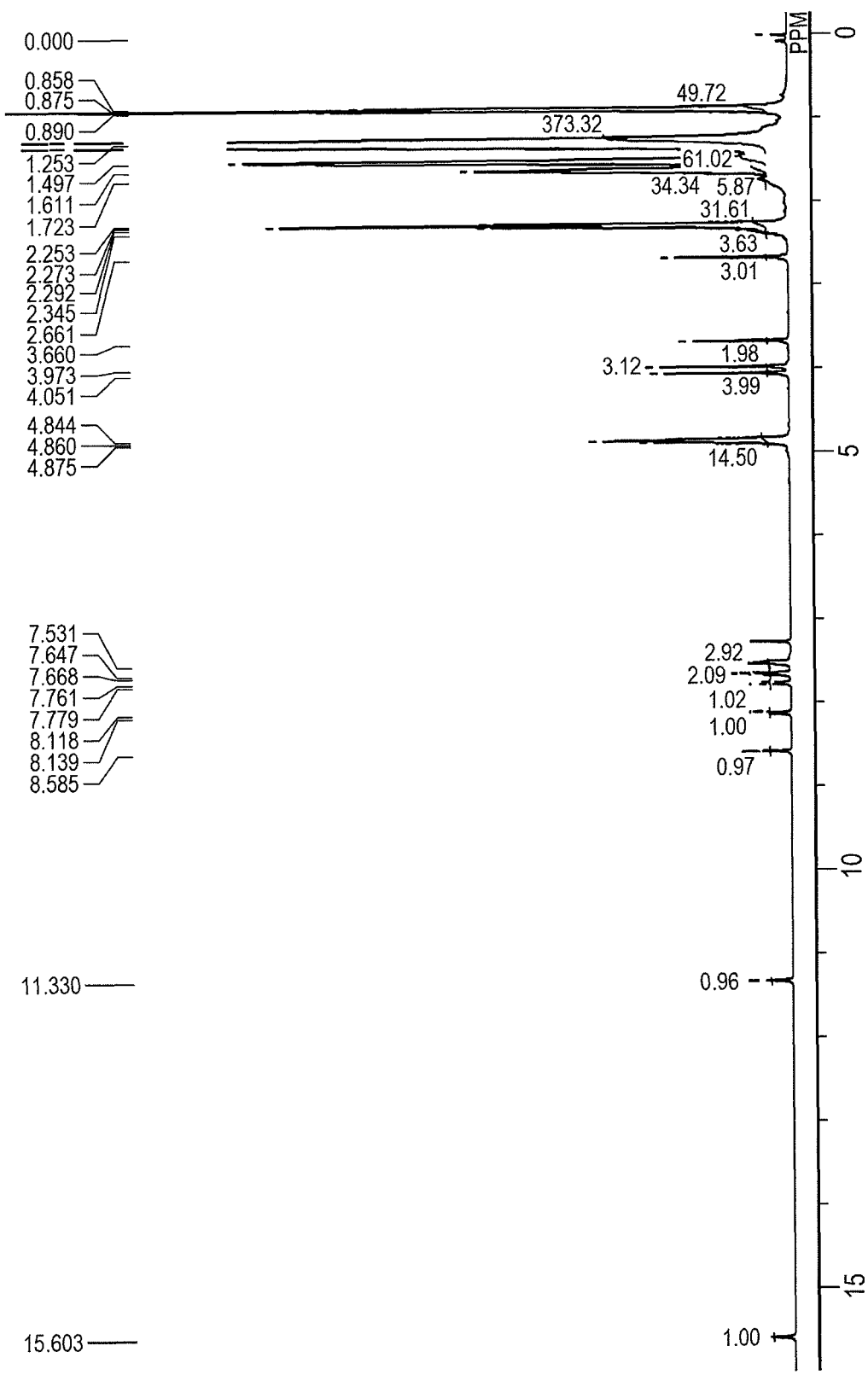
FIG. 2 is a view showing the $^1$H NMR spectrum of a polyester (27) having an azo dye skeleton in $CDCl_3$ at room temperature and 400 MHz.

A polyester (27) having an azo dye skeleton unit was synthesized by performing the same operations except that the resin (A) in the polyester (26) having an azo dye skeleton unit was changed to the resin (B). Results of analysis are shown below. In addition, FIG. 2 shows the $^1$H NMR spectrum of the polyester (27) having an azo dye skeleton unit.

(Results of Analysis of Polyester (27) Having Azo Dye Skeleton Unit)
Results of molecular weight measurement (GPC):
  Weight average molecular weight (Mw)=6,769, number average molecular weight (Mn)=5,485
Result of Acid Value Measurement:
  0.0495 mgKOH/g
Results of $^1$H NMR (400 MHz, CDCl$_3$, room temperature) (see FIG. 2):
  δ [ppm]=15.60 (s, 1H), 11.33 (s, 1H), 8.58 (s, 1H), 8.13 (d, 1H), 7.77 (d, 1H), 7.66 (d, 2H), 7.53 (s, 3H), 4.86 (t, 15H), 4.05 (s, 3H), 3.97 (s, 3H), 3.66 (s, 2H), 2.66 (s, 3H), 2.34 (s, 4H), 2.27 (t, 32H), 1.72 (brs, 6H), 1.61 (m, 34H), 1.50 (m, 61H), 1.25 (m, 383H), 0.87 (t, 50H)

The above-mentioned results of analysis showed that the ratio at which the azo dye skeleton unit was introduced into the carboxyl groups of the resin (B) was 99.8%.

Synthesis Example 3 of Polyester Having Azo Dye Skeleton Unit

Figure 3:
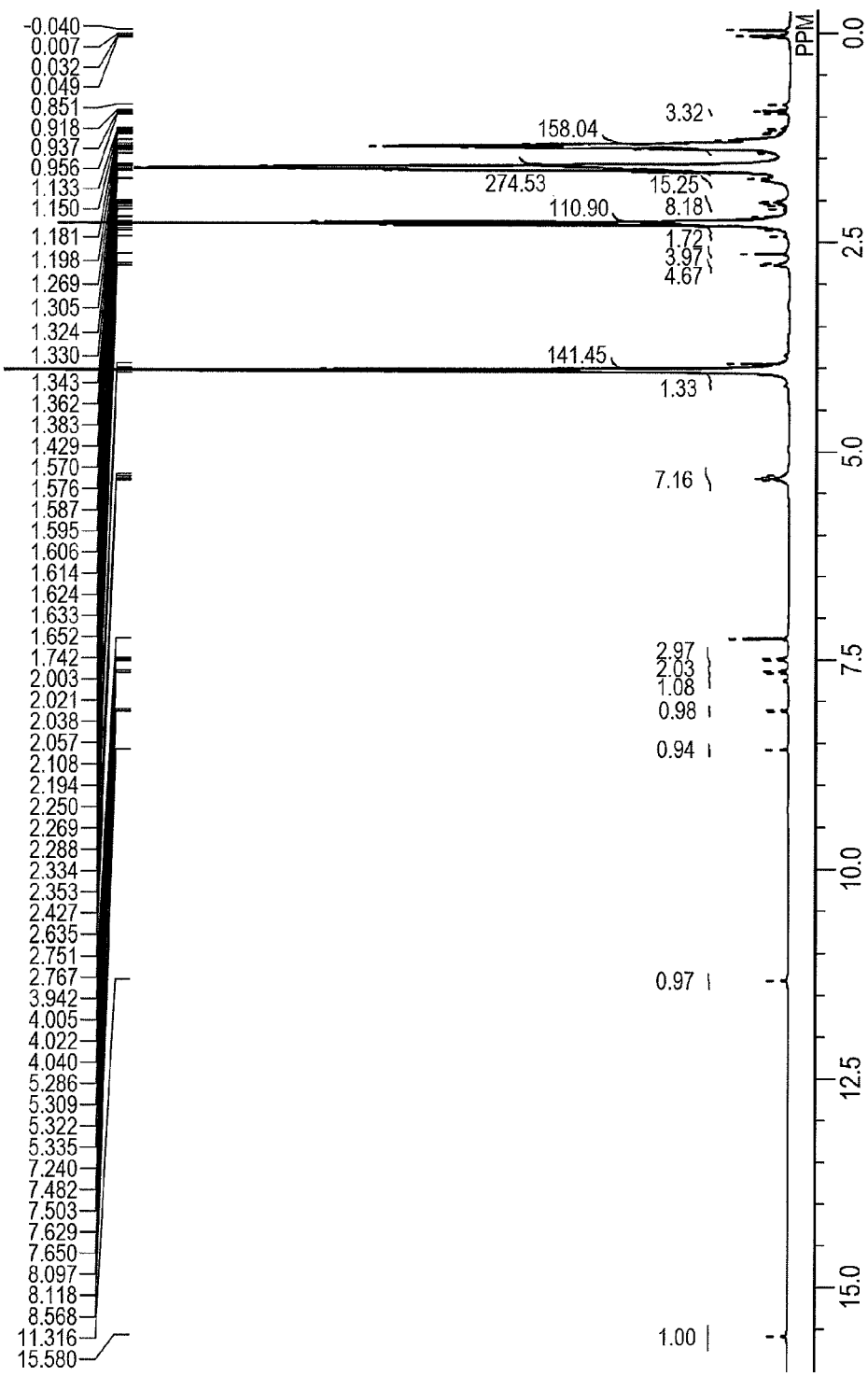
FIG. 3 is a view showing the $^1$H NMR spectrum of a polyester (28) having an azo dye skeleton in $CDCl_3$ at room temperature and 400 MHz.

A polyester (28) having an azo dye skeleton unit was synthesized by performing the same operations except that the resin (A) in the above-mentioned polyester (26) having an azo dye skeleton unit was changed to the resin (C). Results of analysis are shown below. In addition, FIG. 3 shows the $^1$H NMR spectrum of the polyester (28) having an azo dye skeleton unit.

(Results of Analysis of Polyester (28) Having Azo Dye Skeleton Unit)
Results of Molecular Weight Measurement (GPC):
  Weight average molecular weight (Mw)=14,846, number average molecular weight (Mn)=7,117
Result of Acid Value Measurement:
  1.26 mgKOH/g
Results of $^1$H NMR (400 MHz, CDCl$_3$, room temperature) (see FIG. 3):
  δ [ppm]=15.58 (s, 1H), 11.32 (s, 1H), 8.57 (s, 1H), 8.11 (d, 1H), 7.75 (d, 1H), 7.64 (d, 2H), 7.49 (d, 3H), 5.36-5.29 (m, 7H), 4.20 (s, 1H), 3.99 (t, 141H), 2.75 (t, 5H), 2.64 (s, 4H), 2.43 (s, 2H), 2.27 (t, 141H), 2.06 (m, 8H), 1.74 (s, 2H), 1.61 (m, 275H), 1.35 (m, 156H), 0.94 (t, 3H)

The above-mentioned results of analysis showed that the ratio at which the azo dye skeleton unit was introduced into the carboxyl groups of the resin (C) was 87.8%.

Polyesters (29) to (48) having such structures as shown in Table 2 were each produced by performing the same operations as those of the production example of the polyester (26) having an azo dye skeleton unit except that the structure of the azo dye skeleton unit or the polyester resin was changed.

TABLE 2

| Polyester having azo dye skeleton unit | $R_1$ | 2-Position | 3-Position | 4-Position | 5-Position | 6-Position | $R_2$ | $R_3$ | $R_4$ | $R_5$ | $R_6$ | Unit introduction ratio (%) |
|---|---|---|---|---|---|---|---|---|---|---|---|---|
| (26) | CH$_3$ | H | H | Resin (A) | H | H | COOCH$_3$ | H | H | COOCH$_3$ | H | 98.7 |
| (27) | CH$_3$ | H | H | Resin (B) | H | H | COOCH$_3$ | H | H | COOCH$_3$ | H | 99.8 |
| (28) | CH$_3$ | H | H | Resin (C) | H | H | COOCH$_3$ | H | H | COOCH$_3$ | H | 87.8 |
| (29) | CH$_3$ | H | H | Resin (D) | H | H | COOCH$_3$ | H | H | COOCH$_3$ | H | 96.9 |
| (30) | CH$_3$ | H | H | Resin (E) | H | H | COOCH$_3$ | H | H | COOCH$_3$ | H | 82.6 |
| (31) | CH$_3$ | H | H | Resin (F) | H | H | COOCH$_3$ | H | H | COOCH$_3$ | H | 96.9 |
| (32) | CH$_3$ | H | H | Resin (G) | H | H | COOCH$_3$ | H | H | COOCH$_3$ | H | 90.2 |
| (33) | CH$_3$ | H | H | Resin (H) | H | H | COOCH$_3$ | H | H | COOCH$_3$ | H | 86.5 |
| (34) | Ph | H | H | Resin (A) | H | H | COOCH$_3$ | H | H | COOCH$_3$ | H | 96.2 |
| (35) | C$_6$H$_{13}$(n) | H | H | Resin (A) | H | H | COOCH$_3$ | H | H | COOCH$_3$ | H | 97.3 |
| (36) | CH$_3$ | H | Resin (A) | H | H | H | COOCH$_3$ | H | H | COOCH$_3$ | H | 87.3 |
| (37) | CH$_3$ | Resin (A) | H | H | H | H | COOCH$_3$ | H | H | COOCH$_3$ | H | 95.6 |
| (38) | CH$_3$ | H | Resin (A) | H | Resin (A) | H | COOCH$_3$ | H | H | COOCH$_3$ | H | 90.1 |
| (39) | CH$_3$ | H | H | Resin (A) | H | H | COOCH$_3$ | H | H | H | H | 99.3 |
| (40) | CH$_3$ | H | H | Resin (A) | H | H | COOH | H | H | H | H | 91.1 |
| (41) | CH$_3$ | H | H | Resin (A) | H | H | H | COOCH$_3$ | H | COOCH$_3$ | H | 96.3 |
| (42) | CH$_3$ | H | H | Resin (A) | H | H | H | H | COOCH$_3$ | H | H | 99.5 |
| (43) | CH$_3$ | H | H | Resin (A) | H | H | COOC$_2$H$_5$ | H | H | COOC$_2$H$_5$ | H | 97.2 |

TABLE 2-continued

| Polyester having azo dye skeleton unit | $R_1$ | 2-Position | 3-Position | 4-Position | 5-Position | 6-Position | $R_2$ | $R_3$ | $R_4$ | $R_5$ | $R_6$ | Unit introduction ratio (%) |
|---|---|---|---|---|---|---|---|---|---|---|---|---|
| (44) | $CH_3$ | H | H | Resin (A) | H | H | $COOC_3H_7(i)$ | H | H | $COOC_3H_7(i)$ | H | 95.0 |
| (45) | $CH_3$ | H | H | Resin (A) | H | H | $COOC_3H_7(n)$ | H | H | $COOC_3H_7(n)$ | H | 97.6 |
| (46) | $CH_3$ | H | H | Resin (A) | H | H | $CON(C_2H_5)_2$ | H | H | $CON(C_2H_5)_2$ | H | 92.4 |
| (47) | $CH_3$ | H | H | Resin (A) | H | H | $CONHCH_3$ | H | H | $CONHCH_3$ | H | 94.7 |
| (48) | $CH_3$ | H | H | Resin (A) | H | H | $COOCH_3$ | H | H | $COOCH_3$ | H | 48.7 |

(In Table 2, $R_1$ to $R_6$ of each of the polyesters (26) to (37) and (39) to (48) having azo dye skeleton units correspond to $R_1$ to $R_6$ in the formula (1), $R_1$ to $R_6$ of the polyester (38) having an azo dye skeleton unit correspond to $R_1$ to $R_6$ in the formula (2), 1- to 6-positions represent substitution positions with respect to an acylacetamide group in an aryl group substituted with the acylacetamide group in the formula (1) or (2), Ph represents an unsubstituted phenyl group, and (n) and (i) mean that alkyl groups are linear and branched, respectively.)

Comparative Example 1

Comparative azo dye skeleton units represented by the following formulae (49) and (50) were synthesized in accordance with the above-mentioned synthesis methods. After that, the units were each caused to react with a carboxyl group of the resin (A). Thus, polyesters (51) and (52) for comparison were obtained. The introduction ratios of the azo dye skeleton units of the polyesters (51) and (52) were 85.6% and 90.2%, respectively.

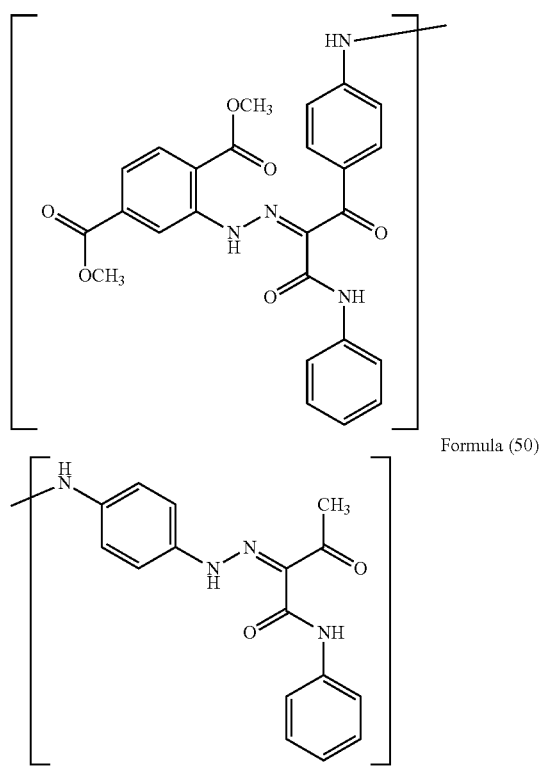

Formula (49)

Formula (50)

Example 3

The pigment dispersions of the present invention were prepared by the following methods.

Preparation Example 1 of Pigment Dispersion 18.0 Parts of the pigment represented by the formula (8) as an azo pigment, 3.6 parts of the polyester (26) having an azo dye skeleton unit as a pigment dispersant, 180 parts of styrene as a water-insoluble solvent, and 130 parts of glass beads (each having a diameter of 1 mm) were mixed, and were then dispersed with an attritor (manufactured by NIPPON COKE & ENGINEERING CO., LTD.) for 3 hours, followed by filtration with a mesh. Thus, a pigment dispersion (a) was obtained.

Preparation Examples 2 to 22 of Pigment Dispersion

Pigment dispersions (b) to (w) were each obtained by performing the same operations as those of Preparation Example 1 of a pigment dispersion except that the polyester (26) having an azo dye skeleton unit was changed to any one of the polyesters (27) to (48) having azo dye skeleton units in Preparation Example 1 of a pigment dispersion.

Preparation Examples 23 and 24 of Pigment Dispersion

Pigment dispersions (x) and (y) were each obtained by performing the same operations as those of Preparation Example 1 of a pigment dispersion except that styrene was changed to toluene or butyl acrylate in Preparation Example 1 of a pigment dispersion.

Preparation Examples 25 and 26 of Pigment Dispersion

Pigment dispersions (z) and (aa) were each obtained by performing the same operations as those of Preparation Example 1 of a pigment dispersion except that the pigment represented by the formula (8) was changed to one of the pigments represented by the following formulae (53) and (54) in Preparation Example 1 of a pigment dispersion.

Formula (53)

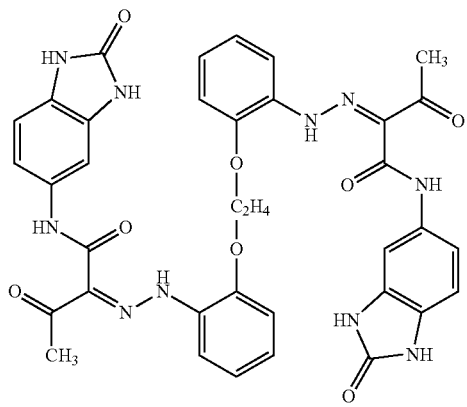

Formula (54)

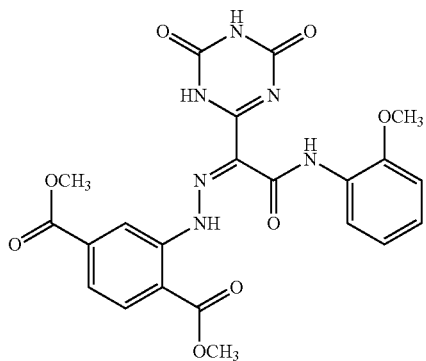

Comparative Example 2

Pigment dispersions for reference and comparison were prepared by the following methods.

Preparation Example 1 of Pigment Dispersion for Reference

A pigment dispersion (ab) for reference was obtained by performing the same operations as those of Preparation Example 1 of a pigment dispersion except that the polyester (26) having an azo dye skeleton unit was not added in Preparation Example 1 of a pigment dispersion.

Preparation Examples 2 and 3 of Pigment Dispersion for Reference

Pigment dispersions (ac) and (ad) for reference were each obtained by performing the same operations except that the polyester (26) having an azo dye skeleton unit was not added in Preparation Example 23 or 24 of a pigment dispersion.

Preparation Examples 4 and 5 of Pigment Dispersion for Reference

Pigment dispersions (ae) and (af) for reference were each obtained by performing the same operations except that the polyester (26) having an azo dye skeleton unit was not added in Preparation Example 25 or 26 of a pigment dispersion.

Preparation Examples 1 to 3 of Pigment Dispersion for Comparison

Pigment dispersions (ag) to (ai) for comparison were each obtained by performing the same operations as those of Preparation Example 1 of a pigment dispersion except that the polyester (26) having an azo dye skeleton unit was changed to any one of a polymer dispersant Solsperse 24000SC (registered trademark) (manufactured by Lubrizol), and the polyesters (51) and (52) for comparison in Preparation Example 1 of a pigment dispersion.

Example 4

The pigment dispersions (a) to (aa) were evaluated by the following method.

Evaluation for Pigment Dispersibility

A pigment dispersion was evaluated for its pigment dispersibility by performing the gloss test of an applied film of the pigment dispersion. The pigment dispersion was skimmed with a dropping pipette, mounted in a linear fashion on super art paper (SA Kanefuji, 180 kg, 80×160, manufactured by Oji Paper Co., Ltd.), and uniformly applied onto the art paper with a wire bar (#10). The gloss (angle of reflection: 60°) of the applied film after drying was measured with a gloss meter Gloss Meter VG2000 (manufactured by NIPPON DENSHOKU INDUSTRIES CO., LTD.). The gloss improvement ratio of the applied film of the pigment dispersion was determined with reference to the gloss of an applied film of any one of the pigment dispersions (ab) to (af) to each of which no pigment dispersant was added because the smoothness of the applied film was improved and its gloss was also improved as a pigment was dispersed more finely. It should be noted that the pigment dispersions (a) to (w) were evaluated with reference to the gloss of the applied film of the pigment dispersion (ab), the pigment dispersions (x) and (y) were evaluated with reference to the glosses of the applied films of the pigment dispersions (ac) and (ad), respectively, and the pigment dispersions (z) and (aa) were evaluated with reference to the glosses of the applied films of the pigment dispersions (ae) and (af), respectively. Then, the pigment dispersion was evaluated for its pigment dispersibility by the following criteria.

A: The gloss improvement ratio is 20% or more.

B: The gloss improvement ratio is 10% or more and less than 20%.

C: The gloss improvement ratio is 1% or more and less than 10%.

D: The gloss improvement ratio is less than 1% (the case where the gloss reduces is also included).

The pigment dispersion was judged to have good pigment dispersibility when its gloss improvement ratio was 10% or more.

Table 3 shows the results of the evaluation of the pigment dispersions of the present invention.

Comparative Example 3

The pigment dispersions (ag) to (ai) for comparison were each evaluated in the same manner as in Example 4. Table 3 shows the results of the evaluation.

TABLE 3

Results of evaluation of pigment dispersions

| Pigment dispersion No. | Polyester No. | Water-insoluble solvent | Pigment | Pigment dispersibility |
|---|---|---|---|---|
| (a) | (26) | Styrene | (8) | A |
| (b) | (27) | Styrene | (8) | A |
| (c) | (28) | Styrene | (8) | A |
| (d) | (29) | Styrene | (8) | A |
| (e) | (30) | Styrene | (8) | A |
| (f) | (31) | Styrene | (8) | A |
| (g) | (32) | Styrene | (8) | A |
| (h) | (33) | Styrene | (8) | A |
| (i) | (34) | Styrene | (8) | B |
| (j) | (35) | Styrene | (8) | B |
| (k) | (36) | Styrene | (8) | A |
| (l) | (37) | Styrene | (8) | B |
| (m) | (38) | Styrene | (8) | A |
| (n) | (39) | Styrene | (8) | A |
| (o) | (40) | Styrene | (8) | A |
| (p) | (41) | Styrene | (8) | B |
| (q) | (42) | Styrene | (8) | B |
| (r) | (43) | Styrene | (8) | A |
| (s) | (44) | Styrene | (8) | B |
| (t) | (45) | Styrene | (8) | B |
| (u) | (46) | Styrene | (8) | B |
| (v) | (47) | Styrene | (8) | B |
| (w) | (48) | Styrene | (8) | A |
| (x) | (26) | Toluene | (8) | A |
| (y) | (26) | Butyl acrylate | (8) | A |
| (z) | (26) | Styrene | (53) | B |
| (aa) | (26) | Styrene | (54) | B |
| (ab) | None | Styrene | (8) | D |
| (ac) | None | Toluene | (8) | D |
| (ad) | None | Butyl acrylate | (8) | D |
| (ae) | None | Styrene | (53) | D |
| (af) | None | Styrene | (54) | D |
| (ag) | Solsperse 24000SC | Styrene | (8) | D |
| (ah) | (51) | Styrene | (8) | C |
| (ai) | (52) | Styrene | (8) | C |

It was confirmed from Table 3 that the polyester having an azo dye skeleton unit of the present invention was useful as an azo pigment dispersant because a pigment dispersion containing a polyester having a unit having a structure represented by the formula (1) or (2) showed good dispersibility for an azo pigment.

Comparison between the pigment dispersion (ah) or (ai) for comparison and the pigment dispersion of the present invention showed that the position at which a polyester residue was bonded affected the pigment dispersibility.

Preparation Example 27 of Pigment Dispersion 42.0 parts of the pigment represented by the formula (8) as an azo pigment, and 8.4 parts of the polyester (26) having an azo dye skeleton unit as a pigment dispersant were mixed by Hybridization system NHS-0 (manufactured by NARA MACHINERY CO., LTD.) to prepare a pigment composition.

18.0 parts of the pigment composition and 180 parts of styrene were mixed by Paint Shaker (manufactured by TOYO SEIKI SEISAKU-SYO, LTD.) for one hour. And then, the mixture was filtered with a mesh to obtain a pigment dispersion. The pigment dispersion was evaluated for its dispersibility by the method described above, and it showed good dispersibility.

Example 5

Yellow toners were produced by the following methods according to a suspension polymerization method.

Production Example 1 of Yellow Toner

710 Parts of ion-exchanged water and 450 parts of a 0.1-mol/l aqueous solution of $Na_3PO_4$ were added to a 2-1 four-necked flask provided with a high-speed stirring apparatus T.K. homomixer (manufactured by PRIMIX Corporation), and were then heated to 60° C. while the number of revolutions was adjusted to 12,000 rpm. 68 Parts of a 1.0-mol/l aqueous solution of $CaCl_2$ were gradually added to the mixture so that an aqueous medium containing a fine, hardly water-soluble dispersion stabilizer $Ca_3(PO_4)_2$ was prepared. Next, the following compositions were heated to 60° C., and were then uniformly dissolved and dispersed with a high-speed stirring apparatus T.K. homomixer (manufactured by PRIMIX Corporation) at 5,000 rpm.

Pigment dispersion (a): 132 parts
Styrene monomer: 46 parts
n-Butyl acrylate monomer: 34 parts
Polar resin (saturated polyester resin (terephthalic acid-propylene oxide modified bisphenol A, acid value: 15, peak molecular weight: 6,000)): 10 parts
Ester wax (peak temperature of the highest endothermic peak in DSC: 70° C., Mn: 704): 25 parts
Aluminum salicylate compound (manufactured by Orient Chemical Industries, Ltd., trade name: Bontron E-88): 2 parts
Divinylbenzene monomer: 0.1 part 10 Parts of 2,2'-azobis(2,4-dimethylvaleronitrile) as a polymerization initiator were added to the above-mentioned materials, and then the mixture was loaded into the above-mentioned aqueous medium. The resultant liquid was granulated for 15 minutes while the number of revolutions was maintained at 12,000 rpm. After that, the stirrer was changed from the high-speed stirring apparatus to a propeller stirring blade, and polymerization was continued at a liquid temperature of 60° C. for 5 hours. After that, the liquid temperature was increased to 80° C., and then the polymerization was continued for 8 hours. After the completion of the polymerization reaction, the remaining monomer was removed by distillation at 80° C. under reduced pressure. After that, the remainder was cooled to 30° C. Thus, a polymer fine particle dispersion liquid was obtained.

The above-mentioned polymer fine particle dispersion liquid thus obtained was transferred to a washing container, and then dilute hydrochloric acid was added to the dispersion liquid while the dispersion liquid was stirred. The mixture was stirred at a pH of 1.5 for 2 hours so that compounds of phosphoric acid and calcium containing $Ca_3(PO_4)_2$ were dissolved. After that, the resultant was subjected to solid-liquid separation with a filter. Thus, polymer fine particles were obtained. The fine particles were loaded into water, and then the mixture was stirred so as to turn into a dispersion liquid again. After that, the dispersion liquid was subjected to solid-liquid separation with the filter. The redistribution of the polymer fine particles in water and the solid-liquid separation were repeatedly performed until the compounds of phosphoric acid and calcium containing $Ca_3(PO_4)_2$ were sufficiently removed. After that, the polymer fine particles after the final solid-liquid separation were sufficiently dried with a dryer. Thus, yellow toner particles were obtained.

100 Parts of the resultant yellow toner particles were dry-mixed with 1.0 part of a hydrophobic silica fine powder whose surface had been treated with hexamethyldisilazane (having a number average primary particle diameter of 7 nm), 0.15 part of a rutile type titanium oxide fine powder (having a number average primary particle diameter of 45 nm), and 0.5 part of a rutile type titanium oxide fine powder (having a number average primary particle diameter of 200 nm) with a Henschel mixer (manufactured by NIPPON COKE & ENGINEERING CO., LTD.) for 5 minutes. Thus, a yellow toner (1) was obtained.

Production Examples 2 to 23 of Yellow Toner

Yellow toners (2) to (23) were each obtained in the same manner as in Production Example 1 of a yellow toner described above except that the pigment dispersion (a) in Production Example 1 of a yellow toner was changed to any one of the pigment dispersions (b) to (w).

Production Examples 24 and 25 of Yellow Toner

Yellow toners (24) and (25) were each obtained in the same manner as in Production Example 1 of a yellow toner described above except that the pigment dispersion (a) in Production Example 1 of a yellow toner was changed to one of the pigment dispersions (z) and (aa).

Example 6

The yellow toners of the present invention were produced by the following methods according to a suspension granulation method.

Production Example 26 of Yellow Toner

180 Parts of ethyl acetate, 12 parts of the pigment represented by the above-mentioned formula (8), 2.4 parts of the azo compound (26) of the present invention, and 130 parts of glass beads (each having a diameter of 1 mm) were mixed, and were then dispersed with an attritor (manufactured by NIPPON COKE & ENGINEERING CO., LTD.) for 3 hours, followed by filtration with a mesh. Thus, a pigment dispersion (aj) was prepared.

The following compositions were dispersed with a ball mill for 24 hours. Thus, 200 parts of a toner composition mixed liquid were obtained.

Pigment dispersion (aj) described above: 96.0 parts Polar resin (saturated polyester resin (polycondensate of propylene oxide modified bisphenol A and phthalic acid, Tg: 75.9° C., Mw: 11,000, Mn: 4,200, acid value: 11 mgKOH/g)): 85.0 parts Hydrocarbon wax (Fischer-Tropsch wax, peak temperature of the highest endothermic peak in DSC: 80° C., Mw: 750): 9.0 parts Aluminum salicylate compound (manufactured by Orient Chemical Industries, Ltd., trade name: Bontron E-88): 2.0 parts Ethyl acetate (solvent): 10.0 parts The following compositions were dispersed with a ball mill for 24 hours so that carboxymethylcellulose was dissolved. Thus, an aqueous medium was obtained.

Calcium carbonate (coated with an acrylic acid-based copolymer): 20.0 parts

Carboxymethylcellulose (Cellogen BS-H manufactured by Dai-ichi Kogyo Seiyaku Co., Ltd.): 0.5 part Ion-exchanged water: 99.5 parts 1,200 Parts of the aqueous medium were charged into a high-speed stirring apparatus T.K. homomixer (manufactured by PRIMIX Corporation), and were then stirred at a circumferential speed of a rotating blade of 20 m/sec. During the stirring, 1,000 parts of the above-mentioned toner composition mixed liquid were charged into the aqueous medium. The mixture was stirred for 1 minute while the temperature in the apparatus was kept constant at 25° C. Thus, a suspension was obtained.

While 2,200 parts of the above-mentioned suspension were stirred with a FULLZONE blade (manufactured by Kobelco Eco-Solutions Co., Ltd.) at a circumferential speed of 45 m/min, the temperature of the suspension was kept constant at 40° C., and then a vapor phase on the surface of the above-mentioned suspension was forcedly aspirated with a blower so that solvent removal was initiated. At that time, 75 parts of ammonia water diluted to 1% as an ionic substance were added after a lapse of 15 minutes from the initiation of the solvent removal. Subsequently, 25 parts of the above-mentioned ammonia water were added after a lapse of 1 hour from the initiation of the solvent removal. Subsequently, 25 parts of the above-mentioned ammonia water were added after a lapse of 2 hours from the initiation of the solvent removal. Finally, 25 parts of the above-mentioned ammonia water were added after a lapse of 3 hours from the initiation of the solvent removal so that the total addition amount of the ammonia water was 150 parts. Further, the resultant liquid was held for 17 hours from the initiation of the solvent removal while the temperature of the liquid was kept at 40° C. Thus, a toner dispersion liquid in which the solvent (ethyl acetate) had been removed from the suspended particles was obtained.

80 Parts of a 10-mol/l hydrochloric acid were added to 300 parts of the toner dispersion liquid obtained in the solvent-removing step. Further, the mixture was subjected to a neutralization treatment with a 0.1-mol/l aqueous solution of sodium hydroxide. After that, washing with ion-exchanged water by suction filtration was repeated four times. Thus, a toner cake was obtained. The resultant toner cake was dried with a vacuum dryer and sifted with a sieve having an aperture of 45 μm. Thus, yellow toner particles were obtained. Any operation hereafter was the same as that in Production Example 1 of a yellow toner described above. Thus, a yellow toner (26) was obtained.

Production Examples 27 to 48 of Yellow Toner

Yellow toners (27) to (48) were each obtained by the same operations except that the polyester (26) having an azo dye skeleton unit was changed to any one of the polyesters (27) to (48) in Production Example 4 of a yellow toner.

Production Examples 49 and 50 of Yellow Toner

Yellow toners (49) and (50) were each obtained in the same manner as in Production Example 4 of a yellow toner described above except that the pigment represented by the formula (8) was changed to one of the pigments represented by the above-mentioned formulae (53) and (54).

Comparative Example 4

Yellow toners for reference and comparison were produced by the following methods.

Production Example 1 of Yellow Toner for Reference

A yellow toner (51) for reference was obtained in the same manner as in Production Example 1 of a yellow toner except that the polyester (26) having an azo dye skeleton unit was not added.

Production Examples 2 and 3 of Yellow Toner for Reference

Yellow toners (52) and (53) for reference were each obtained in the same manner as in Production Example 24 or 25 of a yellow toner except that the polyester (26) having an azo dye skeleton unit was not added.

Production Examples 1 to 3 of Yellow Toner for Comparison

Yellow toners (54) to (56) for comparison were each obtained in the same manner as in Production Example 1 of a yellow toner except that the polyester (26) having an azo dye skeleton unit was changed to any one of a "Solsperse 24000SC (registered trademark) (manufactured by Lubrizol)," and the polyesters (51) and (52).

Comparative Example 5

Yellow toners for reference each serving as an evaluation reference and yellow toners for comparison were produced for the yellow toners produced in Example 6 by the following methods.

Production Example 4 of Yellow Toner for Reference

A yellow toner (57) for reference was obtained in the same manner as in Production Example 26 of a yellow toner except that the polyester (26) having an azo dye skeleton unit was not added.

Production Examples 5 and 6 of Yellow Toner for Reference

Yellow toners (58) and (59) for reference were each obtained in the same manner as in Production Example 49 or 50 of a yellow toner except that the polyester (26) having an azo dye skeleton unit was not added.

Production Examples 4 to 6 of Yellow Toner for Comparison

Yellow toners (60) to (62) for comparison were each obtained in the same manner as in Production Example 26 of a yellow toner except that the polyester (26) having an azo dye skeleton unit was changed to any one of a "Solsperse 24000SC (registered trademark) (manufactured by Lubrizol)," and the polyesters (51) and (52) for comparison in Production Example 26 of a yellow toner.

Example 7

Evaluation of Yellow Toner for its Tone

5 Parts of each of the yellow toners (1) to (50) were mixed with 95 parts of a ferrite carrier coated with an acrylic resin so that a developer was obtained. An image was output with a reconstructed apparatus of a color copying machine CLC-1100 (manufactured by Canon Inc., a fixing oil-applying mechanism was removed) under an environment having a temperature of 25° C. and a humidity of 60% RH. Then, the $L^*$ and $C^*$ of the image in an $L^*a^*b^*$ colorimetric system specified by the International Commission on Illumination (CIE) were measured with a reflection densitometer Spectrolino (manufactured by GretagMacbeth) under the conditions of a D50 light source and a view angle of 2°. Each of the toners was evaluated for its tone by the improvement ratio of the $C^*$ at an $L^*$ of 95.5.

The improvement ratio of the $C^*$ of each of the images developed with the yellow toners (1) to (23) was determined with reference to the $C^*$ of an image developed with the yellow toner (51) for reference. The improvement ratio of the $C^*$ of the image developed with the yellow toner (24) was determined with reference to the $C^*$ of an image developed with the yellow toner (52) for reference. The improvement ratio of the $C^*$ of the image developed with the yellow toner (25) was determined with reference to the $C^*$ of an image developed with the yellow toner (53) for reference.

The improvement ratio of the $C^*$ of each of the images developed with the yellow toners (26) to (48) was determined with reference to the $C^*$ of an image developed with the yellow toner (57) for reference. The improvement ratio of the $C^*$ of the image developed with the yellow toner (49) was determined with reference to the $C^*$ of an image developed with the yellow toner (58) for reference. The improvement ratio of the $C^*$ of the image developed with the yellow toner (50) was determined with reference to the $C^*$ of an image developed with the yellow toner (59) for reference.

Criteria by which a yellow toner is evaluated for its tone are described below.

A: The improvement ratio of the $C^*$ is 5% or more.
B: The improvement ratio of the $C^*$ is 1% or more and less than 5%.
C: The improvement ratio of the $C^*$ is less than 1%.
D: The $C^*$ reduces.

The yellow toner was judged to have a good tone when the improvement ratio of the $C^*$ was 1% or more.

Table 4 shows the results of the evaluation of the yellow toners produced by the suspension polymerization method and Table 5 shows the results of the evaluation of the yellow toners produced by the suspension granulation method.

Comparative Example 6

Evaluation of Yellow Toner for Comparison for its Tone

The yellow toners (54) to (56) and (60) to (62) for comparison were each evaluated in the same manner as in Example 7.

The improvement ratio of the $C^*$ of each of the images developed with the yellow toners (54) to (56) for comparison was determined with reference to the $C^*$ of an image developed with the yellow toner (51) for reference.

The improvement ratio of the $C^*$ of each of the images developed with the yellow toners (60) to (62) for comparison was determined with reference to the $C^*$ of an image developed with the yellow toner (57) for reference.

TABLE 4

Results of evaluation of yellow toners produced by suspension polymerization of the present invention

| Yellow toner No. | Polyester No. | Pigment | Tone evaluation |
|---|---|---|---|
| (1) | (26) | (8) | A |
| (2) | (27) | (8) | A |
| (3) | (28) | (8) | A |
| (4) | (29) | (8) | A |
| (5) | (30) | (8) | A |
| (6) | (31) | (8) | A |
| (7) | (32) | (8) | A |
| (8) | (33) | (8) | A |
| (9) | (34) | (8) | B |
| (10) | (35) | (8) | B |
| (11) | (36) | (8) | A |
| (12) | (37) | (8) | B |
| (13) | (38) | (8) | A |
| (14) | (39) | (8) | A |

TABLE 4-continued

Results of evaluation of yellow toners produced by suspension polymerization of the present invention

| Yellow toner No. | Polyester No. | Pigment | Tone evaluation |
|---|---|---|---|
| (15) | (40) | (8) | A |
| (16) | (41) | (8) | B |
| (17) | (42) | (8) | B |
| (18) | (43) | (8) | A |
| (19) | (44) | (8) | B |
| (20) | (45) | (8) | B |
| (21) | (46) | (8) | B |
| (22) | (47) | (8) | B |
| (23) | (48) | (8) | A |
| (24) | (26) | (53) | B |
| (25) | (26) | (54) | B |
| (51) | None | (8) | C |
| (52) | None | (53) | C |
| (53) | None | (54) | C |
| (54) | Solsperse 24000SC | (8) | C |
| (55) | (51) | (8) | D |
| (56) | (52) | (8) | D |

TABLE 5

Results of evaluation of yellow toners produced by suspension granulation of the present invention

| Yellow toner No. | Dye compound No. | Pigment | Tone evaluation |
|---|---|---|---|
| (26) | (26) | (8) | A |
| (27) | (27) | (8) | B |
| (28) | (28) | (8) | A |
| (29) | (29) | (8) | A |
| (30) | (30) | (8) | B |
| (31) | (31) | (8) | B |
| (32) | (32) | (8) | A |
| (33) | (33) | (8) | A |
| (34) | (34) | (8) | B |
| (35) | (35) | (8) | B |
| (36) | (36) | (8) | A |
| (37) | (37) | (8) | B |
| (38) | (38) | (8) | A |
| (39) | (39) | (8) | A |
| (40) | (40) | (8) | A |
| (41) | (41) | (8) | B |
| (42) | (42) | (8) | B |
| (43) | (43) | (8) | A |
| (44) | (44) | (8) | B |
| (45) | (45) | (8) | B |
| (46) | (46) | (8) | A |
| (47) | (47) | (8) | B |
| (48) | (48) | (8) | A |
| (49) | (26) | (53) | B |
| (50) | (26) | (54) | B |
| (57) | None | (8) | C |
| (58) | None | (53) | C |
| (59) | None | (54) | C |
| (60) | Solsperse 24000SC | (8) | D |
| (61) | (51) | (8) | D |
| (62) | (52) | (8) | D |

Tables 4 and 5 showed that a toner using the polyester having an azo dye skeleton unit of the present invention as a pigment dispersant had high chroma and a good tone. The foregoing confirmed that the polyester having an azo dye skeleton unit of the present invention was useful as an azo pigment dispersant for toner.

The polyester having an azo dye skeleton unit of the present invention is particularly suitably used as a dispersant for dispersing an azo pigment in a water-insoluble solvent. In addition, the polyester can be used not only as a pigment dispersant but also as a coloring agent for an electrophotographic toner, inkjet ink, heat-sensitive transfer recording sheet, or color filter or as a dye for an optical recording medium.

This application claims the benefit of Japanese Patent Application No. 2010-186820, filed Aug. 24, 2010, which is hereby incorporated by reference herein in its entirety.

The invention claimed is:

1. A polyester, comprising at least one unit represented by one of formula (1) and formula (2):

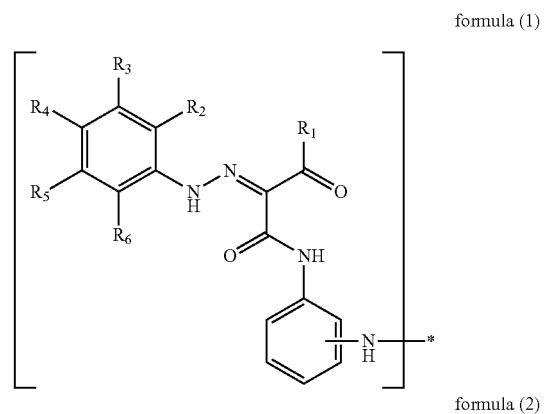

formula (1)

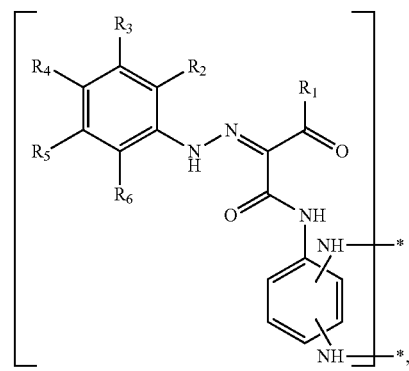

formula (2)

wherein in the formula (1) and in the formula (2):
* represents a bonding portion in the polyester;
$R_1$ represents an alkyl group having 1 to 6 carbon atoms or a phenyl group;
$R_2$ to $R_6$ each represent a hydrogen atom, a $COOR_7$ group, or a $CONR_8R_9$ group, provided that at least one of $R_2$ to $R_6$ represents the $COOR_7$ group or the $CONR_8R_9$ group; and
$R_7$ to $R_9$ each represent a hydrogen atom or an alkyl group having 1 to 3 carbon atoms,
wherein the polyester has:
(i) a unit represented by formula (3) and a unit represented by formula (4):

formula (3)

$+O-L_2-O+$, formula (4)

wherein, in the formula (3), $L_1$ represents a divalent linking group; and
wherein, in the formula (4), $L_2$ represents a divalent linking group, or (ii) a unit represented by formula (6):

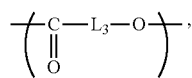

formula (6)

wherein, in the formula (6), $L_3$ represents a divalent linking group.

2. The polyester according to claim 1, wherein $R_2$ in the formula (1) and in the formula (2) represents a COOH group or a COOCH$_3$ group.

3. The polyester according to claim 1, wherein $R_1$ in the formula (1) and in the formula (2) represents a methyl group.

4. The polyester according to claim 1, wherein:
$L_1$ in the formula (3) represents an alkylene group, an alkenylene group, or an arylene group; and
$L_2$ in the formula (4) represents an alkylene group or a phenylene group, or the unit represented by the formula (4) is a unit represented by formula (5):

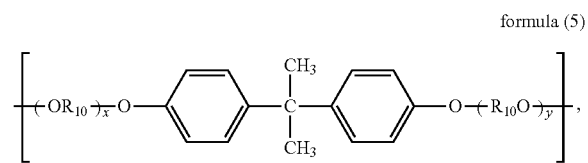

formula (5)

wherein, in the formula (5), $R_{10}$ represents an ethylene group or a propylene group, x and y each represent an integer of 0 or more, and an average of x+y is 2 to 10.

5. The polyester according to claim 1, wherein $L_3$ in the formula (6) represents an alkylene group or an alkenylene group.

6. The polyester according to claim 1, wherein the polyester has a unit represented by the formula (1), and wherein the unit represented by the formula (1) is a unit represented by formula (7):

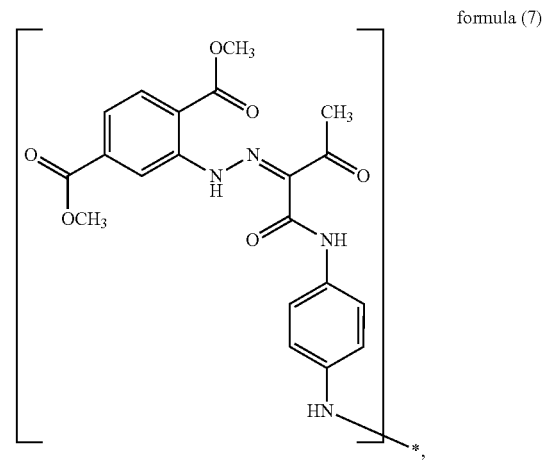

formula (7)

wherein, in the formula (7), * represents a bonding portion in the polyester.

7. A pigment composition, comprising:
the polyester according to claim 1; and
an azo pigment.

8. The pigment composition according to claim 7, wherein the azo pigment is an azo pigment represented by formula (8):

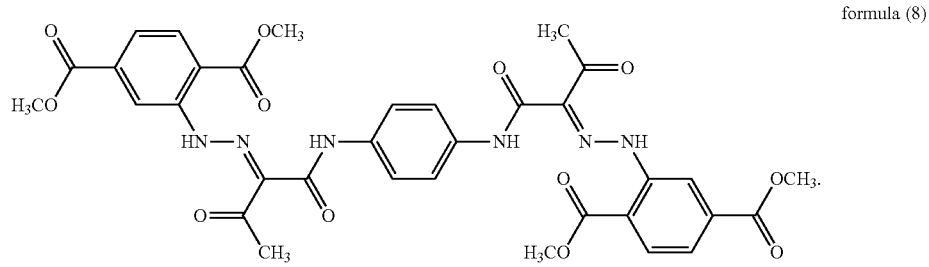 [SMILES: COC(=O)c1ccc(C(=O)OC)c(N/N=C(\C(C)=O)C(=O)Nc2ccc(NC(=O)/C(=N/Nc3cc(C(=O)OC)ccc3C(=O)OC)C(C)=O)cc2)c1]

formula (8)

9. A toner, comprising a toner particle having a binding resin, a coloring agent, and a releasing agent, wherein the coloring agent contains the pigment composition according to claim 7.

* * * * *